(12) United States Patent
Houjou et al.

(10) Patent No.: US 9,122,979 B2
(45) Date of Patent: Sep. 1, 2015

(54) IMAGE PROCESSING APPARATUS TO PERFORM PHOTO-TO-PAINTING CONVERSION PROCESSING

(71) Applicant: CASIO COMPUTER CO., LTD., Shibuya-ku, Tokyo (JP)

(72) Inventors: Yoshiharu Houjou, Tokyo (JP); Akihiro Tsukamoto, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/618,842

(22) Filed: Feb. 10, 2015

(65) Prior Publication Data

US 2015/0154480 A1 Jun. 4, 2015

Related U.S. Application Data

(62) Division of application No. 13/220,417, filed on Aug. 29, 2011.

(30) Foreign Application Priority Data

Aug. 31, 2010 (JP) .................................. 2010-193352

(51) Int. Cl.
*G06F 15/00* (2006.01)
*G06K 15/02* (2006.01)
(Continued)

(52) U.S. Cl.
CPC .......... *G06K 15/1878* (2013.01); *G06F 3/1236* (2013.01); *G06K 15/005* (2013.01); *H04N 1/32358* (2013.01); *G06K 2215/0094* (2013.01)

(58) Field of Classification Search
CPC ............. G06K 9/00221; G06T 11/001; H04N 1/00137; H04N 1/00145; H04N 1/00161; H04N 1/00167; H04N 1/0019; H04N 1/00244; H04N 1/00336; H04N 1/00132; H04N 1/32128; H04N 2101/00; H04N 2101/001; H04N 2101/0084; H04N 2101/3236; H04N 2101/3242; H04N 2101/325; H04N 2101/3278
USPC ........... 358/1.2, 2.1, 3.09, 3.1, 3.13, 1.9, 461; 345/589, 593, 619; 382/118

See application file for complete search history.

(56) References Cited

U.S. PATENT DOCUMENTS 5,621,868 A  4/1997  Mizutani et al.
5,844,565 A  12/1998  Mizutani et al.

(Continued)

FOREIGN PATENT DOCUMENTS

JP   146905 B2   10/1989
JP   0844867 A   2/1996

(Continued)

OTHER PUBLICATIONS

Japanese Office Action dated Feb. 10, 2015, issued in counterpart Japanese Application No. 2013-257147.

(Continued)

*Primary Examiner* — Gabriel Garcia
(74) *Attorney, Agent, or Firm* — Holtz, Holtz, Goodman & Chick PC

(57) ABSTRACT

An image processing apparatus includes a storage to store an original image, a processor to change a tone of a reduced image of the original image, a display to display a tone-changed reduced image, a connection determination unit to determine whether the image processing apparatus is connected to a network, a transmitter to transmit the original image to the server via the network together with data indicating a tone when the image processing apparatus is connected to the network, a controller to cause the processor to change the tone of the original image when the image processing apparatus is not connected to the network, and a receiver to receive the original image whose tone is changed by the server when the image processing apparatus is connected to the network.

4 Claims, 16 Drawing Sheets

(51) Int. Cl.
*H04N 1/32* (2006.01)
*G06F 3/12* (2006.01)
*G06K 15/00* (2006.01)
*G06K 1/00* (2006.01)

(56) References Cited

U.S. PATENT DOCUMENTS

| | | | |
|---|---|---|---|
| 2005/0099500 A1* | 5/2005 | Fujita | 348/207.99 |
| 2006/0098650 A1* | 5/2006 | Beninato et al. | 370/389 |
| 2006/0123266 A1 | 6/2006 | Matsumoto | |
| 2006/0256376 A1* | 11/2006 | Hirooka | 358/1.15 |
| 2011/0235905 A1 | 9/2011 | Yokokawa | |
| 2011/0279640 A1* | 11/2011 | Choi | 348/14.12 |

FOREIGN PATENT DOCUMENTS

| | | | |
|---|---|---|---|
| JP | 1084520 A | 3/1998 |
| JP | 2002369164 A | 12/2002 |
| JP | 200391675 A | 3/2003 |
| JP | 2003087618 A | 3/2003 |
| JP | 2004005345 A | 1/2004 |
| JP | 2004213598 A | 7/2004 |
| JP | 2004363704 A | 12/2004 |
| JP | 2005117527 A | 4/2005 |
| JP | 2006074570 A | 3/2006 |
| JP | 2006166064 A | 6/2006 |
| JP | 2006191546 A | 7/2006 |
| JP | 2006309462 A | 11/2006 |
| JP | 2007208430 A | 8/2007 |
| JP | 2008252556 A | 10/2008 |
| JP | 200987099 A | 4/2009 |
| JP | 2009141678 A | 6/2009 |
| JP | 2009288507 A | 12/2009 |
| JP | 201061246 A | 3/2010 |
| JP | 201086194 A | 4/2010 |
| JP | 2010146264 A | 7/2010 |
| JP | 2010151951 A | 7/2010 |

OTHER PUBLICATIONS

English machine translation of JP2005117527, Publication date Apr. 28, 2005.
English machine translation of JP2004363704, Publication date Dec. 24, 2004.
Japanese Office Action dated Mar. 26, 2013 (and English translation thereof) in counterpart Japanese Application No. 2011-185626.
Japanese Office Action dated Aug. 14, 2012 (and English translation thereof) in counterpart Japanese Application No. 2011-185626.

* cited by examiner

FIG.6

| | M1 | M2 | M3 | M4 | M5 | |
|---|---|---|---|---|---|---|
| | NAME | MAIL ADDRESS | FACE IMAGE | PERSONAL IDENTIFICATION CODE | OTHER INFORMATION | |
| | FATHER | father@*..jp | | 1001 | | 331 |
| | MOTHER | mom@*..jp | | 1002 | | |
| | BROTHER | | | 1003 | | |
| | SISTER | | | 1004 | | |
| | | | | | | |
| | MR. A | aaa@*..jp | | 1101 | | 332 |
| | MR. B | bbb@***.com | | 1052 | | |
| | MR. C | | | 1234 | | |
| | | | | | | |
| | | | | | | |
| | | | | | | |

33

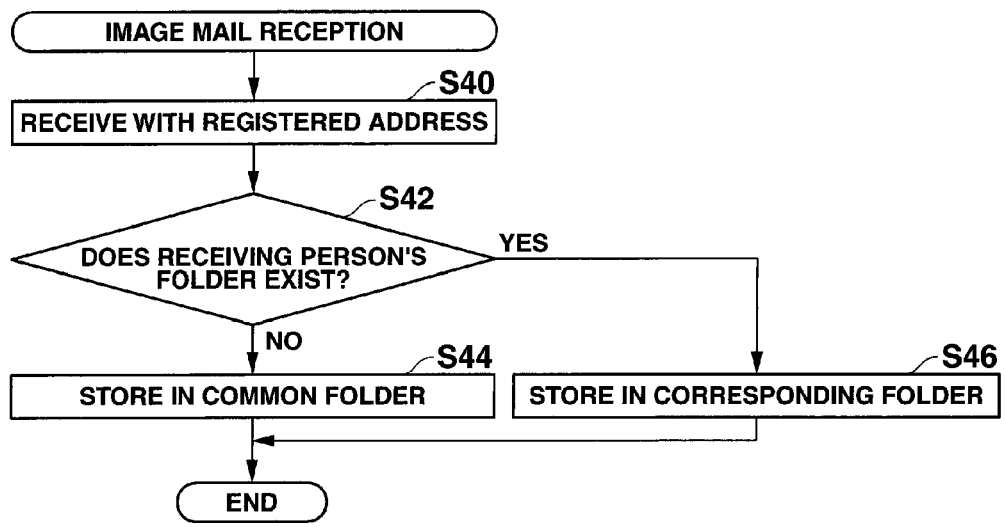
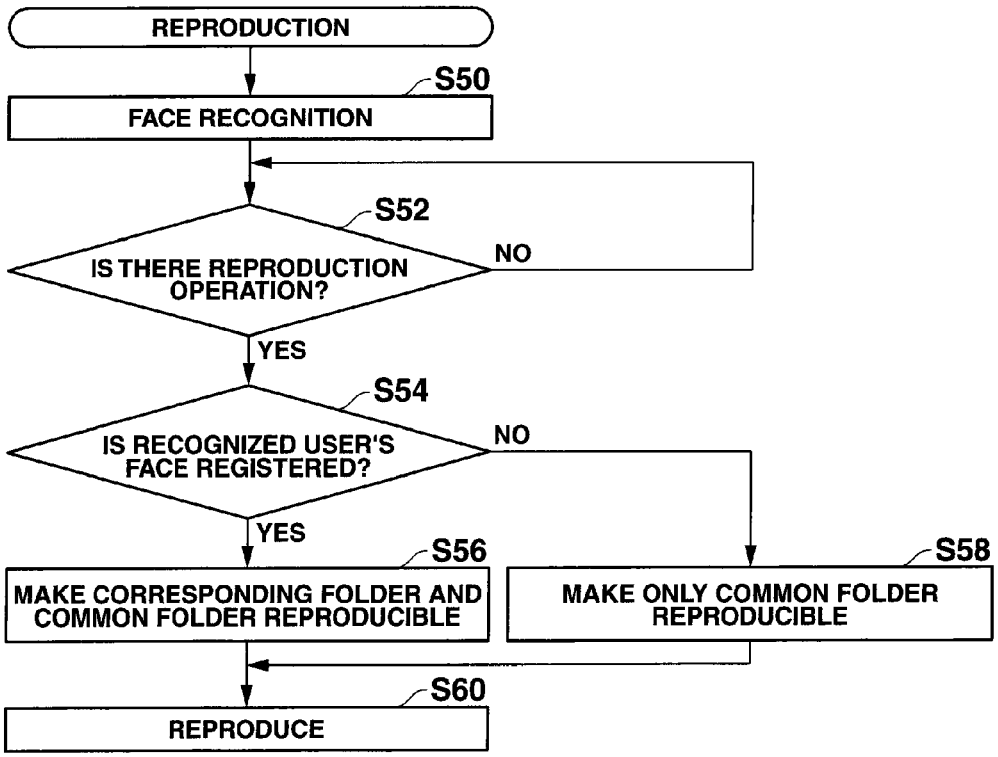

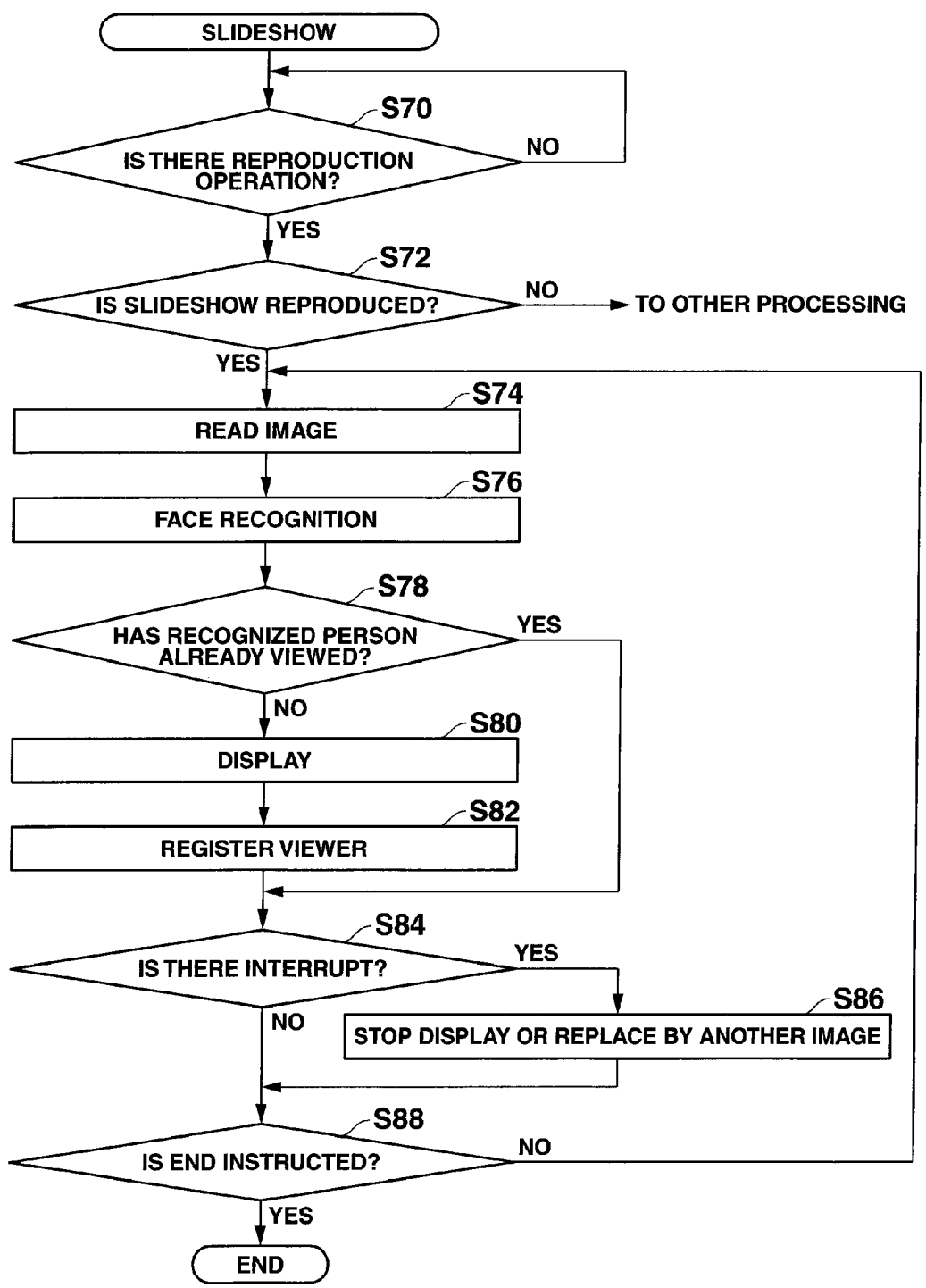

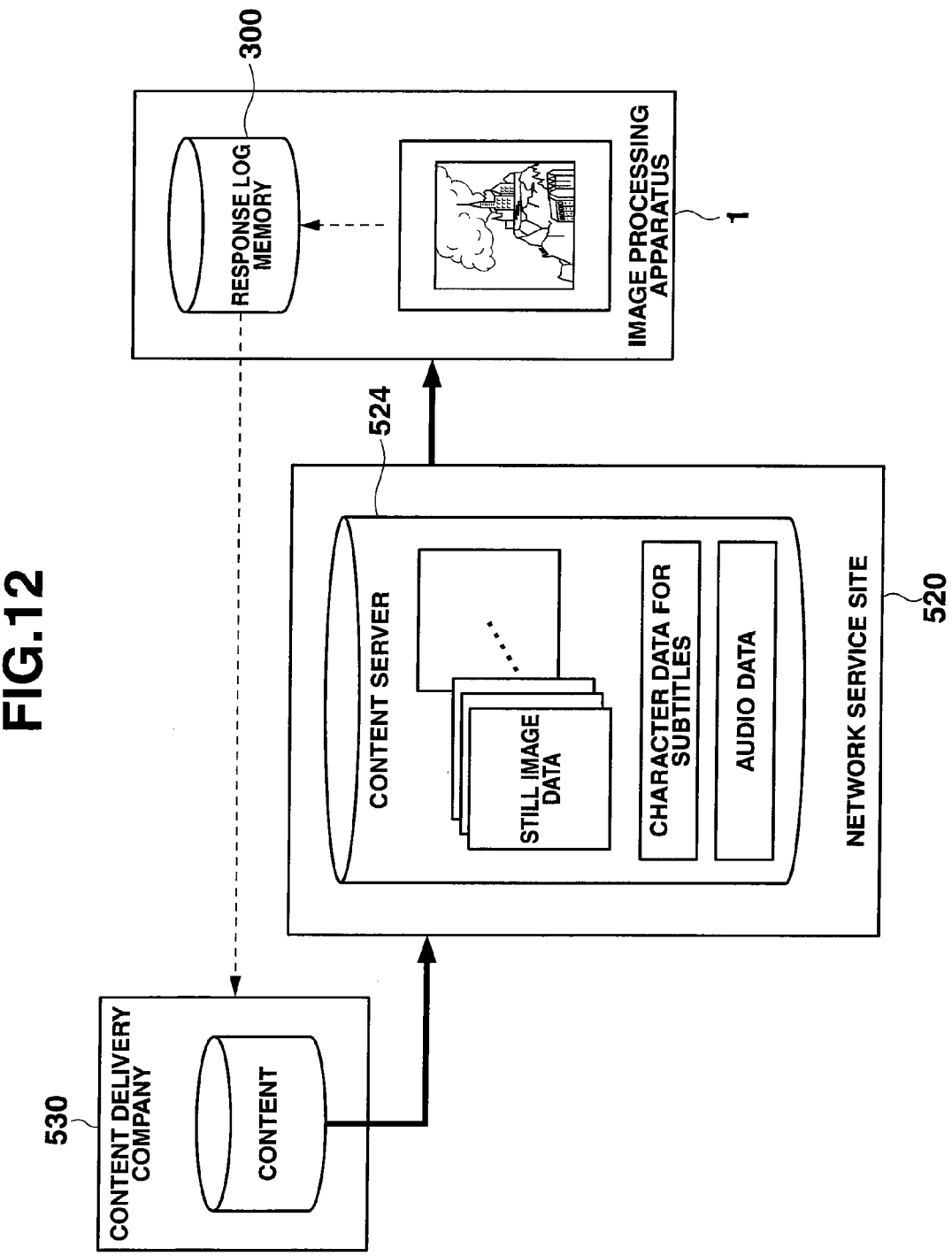

IMAGE PROCESSING APPARATUS TO PERFORM PHOTO-TO-PAINTING CONVERSION PROCESSING

CROSS-REFERENCE TO RELATED APPLICATIONS

This is a Divisional of U.S. application Ser. No. 13/220,417, filed Aug. 29, 2011, which is based upon and claims the benefit of priority from prior Japanese Patent Application No. 2010-193352, filed Aug. 31, 2010, the entire contents of both of which are incorporated herein by reference.

BACKGROUND OF THE INVENTION

1. Field of the Invention

The present invention relates to an image processing apparatus, an image processing method, and an image processing system which changes a tone of an image.

2. Description of the Related Art

In recent years, with the widespread use of digital cameras, storing photos as digital image data is now quite common. Photos can be browsed in a digital camera used for capturing an image or in a personal computer storing captured image data and thus, there have been changes in how to enjoy photos. First, such technology and the evolution of a photo culture will briefly be described with reference to patent documents.

In the environment described above, so-called digital photo frames have been realized and popularized to be able to enjoy image data in the same manner as printed photos (see, for example, Jpn. Pat. Appln. KOKAI Publication No. 2009-141678).

In such a digital photo frame, photos may be reproduced and enjoyed at a time when one chooses, shown as a slideshow. The digital photo frame can be used as an album terminal to save image data.

Moreover, a digital photo frame capable of connecting to a network and transmitting/receiving mail is proposed (see, for example, Jpn. Pat. Appln. KOKAI Publication No. 2010-61246).

Also, a digital photo frame that allows plural persons to browse so that the display is changed depending on the browsing person by registering information about the number of persons is proposed (see, for example, Jpn. Pat. Appln. KOKAI Publication No. 2010-86194).

Further, a technology (photo-to-painting conversion technology) that enables generation and display of a tone of an image of a different taste (for example, a painting tone), though based on an original photo, by performing image processing thereon is proposed (see, for example, Jpn. Pat. Appln. KOKAI Publication No. 08-44867, U.S. Pat. No. 5,621,868).

Further development of the technology of Jpn. Pat. Appln. KOKAI Publication No. 08-44867 leads to a technology to convert a photo into an artwork of high artistic quality by extracting features such as color information and brush touch information from an image of a painting actually painted by a painter and adding extracted features to a captured photo (see, for example, Jpn. Pat. Appln. KOKAI Publication No. 2004-213598).

Also, a technology to change a quality of image data whose tone such as a painting tone has been converted is proposed (see, for example, Jpn. Pat. Appln. KOKOKU Publication No. 01-46905).

Further, a technology capable of, when plural images are sequentially switched and displayed like a slideshow, effectively preventing an image inappropriate for display from being inadvertently displayed is proposed (see, for example, Jpn. Pat. Appln. KOKAI Publication No. 2009-288507).

On the other hand, because a memory card has increasingly more capacities and lower prices, a case when a family takes photos in plural memory cards by plural digital cameras and piles up photos so that the memory cards are not sorted out is increasing. If it is unknown who took what photo in which memory card, it becomes necessary to check each memory card by reproducing the memory card in a camera or digital photo frame and then to sort out photos for separate folders for storage in a personal computer or the like.

Thus, a technology to automatically sort out photos for each folder according to preset conditions to efficiently sort out photos according to the sorting content when a large amount of images is stored in a personal computer is proposed (see, for example, Jpn. Pat. Appln. KOKAI Publication No. 2009-87099).

Such a conventional digital photo frame has an issue of missing something because only images contained the digital photo frame or recorded in a memory card are simply displayed.

Thus, a proposal is made to connect a digital photo frame to the Internet to deliver various content images for a charge or free of charge (see, for example, Jpn. Pat. Appln. KOKAI Publication No. 2003-91675).

According to the technology of Jpn. Pat. Appln. KOKAI Publication No. 2003-91675, delivery of plural genres of free or charged content such as news and advertisements can be received by the digital photo frame.

A kind of content delivery delivers live video of remote live cameras. If the content delivery technology and the above photo-to-painting conversion technology are combined, live video can also be converted into pictorial video. Live video includes image data of real-time dynamic images or still images switched at fixed intervals uploaded to the server and video of a predetermined period, for example, five minutes, displayed repeatedly to provide a sense of dynamism.

In the foregoing, the evolution of a photo culture and the technical background of digital photo frames have been described. In the trend thereof recently, instead of standalone products, products that can be connected to a network are increasing (see, for example, Jpn. Pat. Appln. KOKAI Publication Nos. 2010-61246 and 2003-91675).

Also, a printer that, in addition to viewing in a screen, prints photo-to-painting converted images is proposed (see, for example, Jpn. Pat. Appln. KOKAI Publication No. 10-84520).

Thus, doing photo-to-painting conversion and printing as illustrated by Jpn. Pat. Appln. KOKAI Publication Nos. 08-44867, 2004-213598, 01-46905, and 10-84520 by using a network can be considered.

However, photo-to-painting conversion has a problem that a longer time is needed for conversion processing with a higher level of algorithm.

Also, a standalone personal printer has a problem that it is difficult for the printer to express a photo-to-painting converted image beautifully, and takes a long time to print.

BRIEF SUMMARY OF THE INVENTION

The present invention has been developed from the above background and the facts that a display screen of an image processing apparatus, which is a terminal, is not large enough, a high-speed image processing engine cannot be mounted in a main body of the terminal, and it takes a long time for a CPU mounted on the terminal to perform photo-to-painting conversion processing. An object of the invention is to realize an image processing apparatus that can be connected to a network and aims to realize faster processing and full photo-to-painting conversion processing by performing photo-to-painting conversion processing of only thumbnails of target images inside the terminal and causing a server to perform photo-to-painting conversion processing of original images, which are original images, by sending the original images to a server via the network to seamlessly perform photo-to-painting conversion processing.

Another object of the present invention is to solve the problems that the display screen of the terminal is small and it takes a long time for the image processing engine inside the main body of the terminal to perform photo-to-painting conversion processing by providing a print site to perform photo-to-painting conversion of image data received via a network and including an image processing engine on the side of a network.

A further object of the present invention is to solve the problem that it is difficult for a standalone personal printer to beautifully print a photo-to-painting converted image and it takes a long time to print such an image.

According to an embodiment of the present invention, an image processing apparatus connectable to a server comprises:

a first storage configured to store an original image;

a second storage configured to store data indicating tones;

a selector configured to select a data item indicating a tone from the data stored in the second storage;

a processor configured to change a tone of a reduced image of the original image stored in the first storage based on the selected data item indicating the tone in order to output a tone-changed reduced image;

a display configured to display the tone-changed reduced image output from the processor;

a connection determination unit configured to determine whether the image processing apparatus is connected to the network;

a transmitter configured to transmit the original image stored in the first storage to the server via the network together with the selected data item indicating the tone when the connection determination unit determines that the image processing apparatus is connected to the network;

a conversion controller configured to cause the processor to change the tone of the original image based on the selected data item indicating the tone when the connection determination unit determines that the image processing apparatus is not connected to the network; and a receiver configured to receive the original image whose tone is changed by the server while the image processing apparatus is connected to the network.

According to another embodiment of the present invention, an image processing method for an image processing apparatus connectable to a server comprises:

causing the image processing apparatus to change a tone of a reduced image of the original image; and transmitting an original image to the server over a network to cause the server to change a tone of the original image.

According to another embodiment of the present invention, an image processing system comprises a terminal, and a server connectable to the terminal, wherein the terminal comprises:

a first storage configured to store an original image;

a first processor configured to change a tone of a reduced image of the original image stored in the first storage based on data items indicating tones in order to output a tone-changed reduced image;

a display configured to display the tone converted reduced image output from the first processor;

a connection determination unit configured to determine whether the terminal is connected to a network; and a transmitter configured to transmit the original image to the server via the network when the connection determination unit determines that the terminal is connected to the network, and the server comprises:

a second storage configured to store the original image transmitted from the terminal; and a second processor configured to change the tone of the original image stored in the second storage based on the data items indicating tones.

According to the present invention, photo-to-painting conversion of reduced images is performed by an image processing apparatus so that high-speed photo-to-painting conversion can be achieved and original images with a larger amount of data is performed in a network so that images whose tone has been converted by a full photo-to-painting conversion algorithm can be obtained while providing a comfortable sense of operation.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIG. 6 is a conceptual diagram showing the configuration of an address book 33 in the internal memory 14 of the display apparatus 1 according to the present embodiment.

FIG. 9 is a flowchart showing the procedure when a mail is received by the image processing apparatus 1 according to the present embodiment.

FIG. 10 is a flowchart illustrating a reproduction operation of the image processing apparatus 1 according to the present embodiment.

FIG. 11 is a flowchart showing the procedure for slideshow reproduction during the reproduction operation of the image processing apparatus 1 according to the present embodiment.

FIG. 12 is a block diagram exemplifying a content delivery service by a network regarding an image delivery system according to the present embodiment.

DETAILED DESCRIPTION OF THE INVENTION

An embodiment of an image processing apparatus according to the present invention will now be described with reference to the accompanying drawings.

Figure 1A:
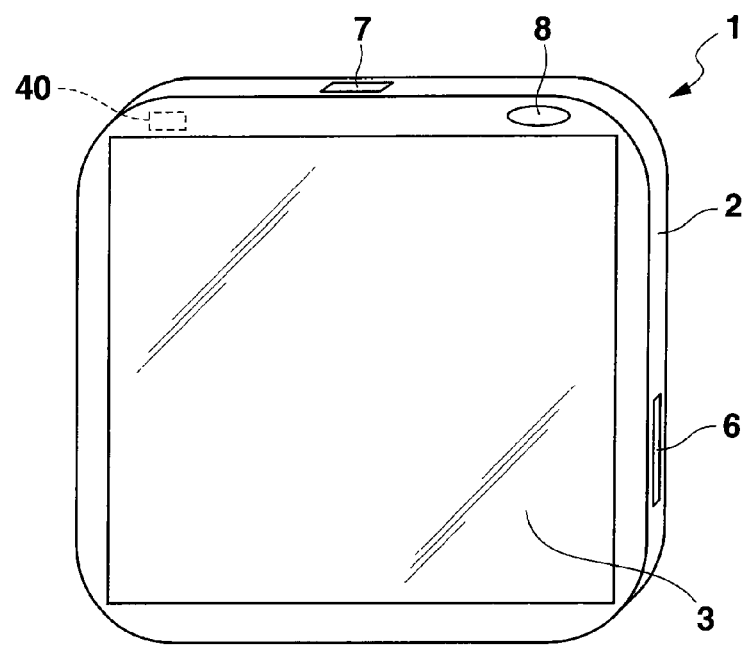
FIG. 1A is a diagram showing an appearance of an image processing apparatus 1 according to an embodiment of the present invention.

FIG. 1A is an appearance of the image processing apparatus 1 according to an embodiment of the present invention.

A display unit including a liquid crystal display panel 3 held in a main body 2 is provided on the front side of the image processing apparatus 1. A touch panel 5 is formed integrally with the liquid crystal display panel 3 and can be operated by touching the panel 3 with a finger. An image sensor 8 is provided in an upper right corner on the front side of the main body 2 and a memory card slot 6 is provided on the side face thereof. Further, a GPS (Global Positioning System) antenna 7 is provided on an upside of the main body 2 and a sensor 40 is provided in an upper left corner on the front side.

FIG. 1S shows a display example of the liquid crystal display panel 3. This example shows a total of four images, a thumbnail and three photo-to-painting converted images, in a row direction of the liquid crystal display panel 3. That is, thumbnails T1 to T4 are displayed on the left end in the liquid crystal display panel 3 in a column direction and corresponding to, for example, the thumbnail T1, photo-to-painting converted images thereof, an "oil painting tone Ta1", "water color tone Tb1", and "pastel painting tone Tc1" are displayed in the row direction. This similarly applies to the other thumbnails T2, T3, T4 and corresponding to each, photo-to-painting converted images thereof, "oil painting tones Ta2, Ta1, and Ta4", "water color tones Tb2, Tb3, Tb4", and "pastel painting tones Tc2, Tc3, Tc4" are displayed in the row direction.

A CPU 11 causes the liquid crystal display panel 3 to display a page down button 301, a page right button 302, a page up button 303, and a page left button 304.

In the present embodiment, the X direction in plane coordinates is called the row direction and the Y direction is called the column direction.

In this state, a touch slide operation by a finger can be performed or the screen can be scrolled downward (arrow Y) by the page down button 301 or in the right direction (arrow X) by the page right button 302.

Figure 2:
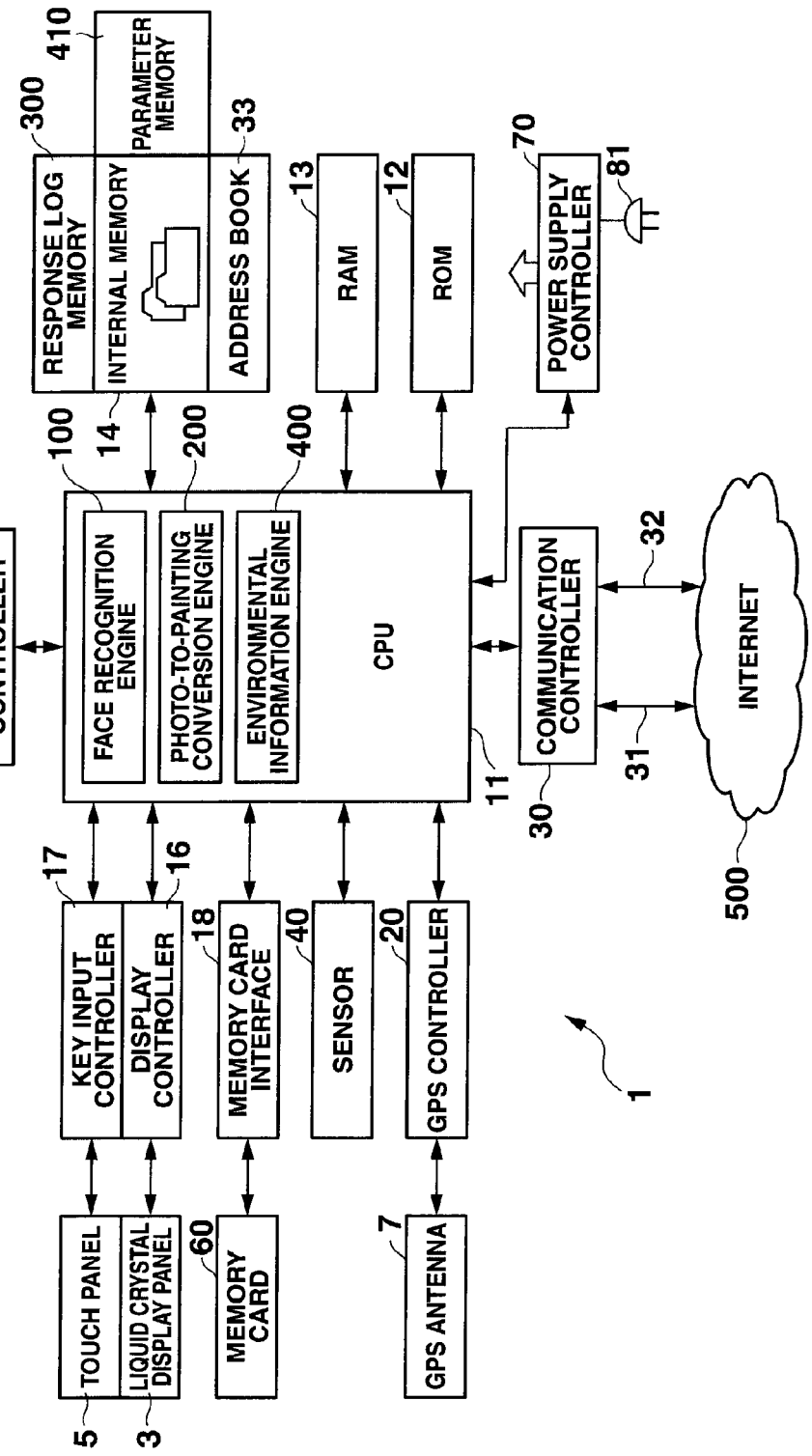
FIG. 2 is a block diagram showing an electric configuration of the image processing apparatus 1 according to the present embodiment.

FIG. 2 is a block diagram showing an electrical configuration of the image processing apparatus 1 according to the present embodiment. The image processing apparatus 1 includes the CPU (Central Processing Unit) 11, a ROM (Read Only Memory) 12 connected to the CPU 11, a RAM (Random Access Memory) 13, and the internal memory 14. Programs causing the CPU 11 to perform operations shown in flowcharts below are stored in the ROM 12. The CPU 11 contains a face recognition engine 100 to perform recognition processing of a face captured by the image sensor 8, a photo-to-Painting conversion engine 200 to convert a photo image into a painting tone image, and an environmental information engine 400 that collects and analyzes environmental information.

The face recognition engine 100 is capable of recognizing, when plural faces are taken in a photo, each of the faces.

The photo-to-painting conversion engine 200 performs photo-to-painting conversion processing as disclosed by, for example, Jpn. Pat. Appln. KOKAI Publication Nos. 8-44867 and 2004-213598. The photo-to-painting conversion processing by the photo-to-painting conversion engine 200 includes processing that converts a photo image stored in the memory card 60 and to be displayed or a photo image from the content delivery site 530 into a painting tone image having features of a painting, that is, a painting tone image to which a specific effect is given and displays the converted painting tone image in the liquid crystal display panel 3.

The type of painting set as a target for conversion into a painting tone image, that is, features (image tone, image style) for the converted image can be selected. Image tones selectable in the present embodiment include oil painting, thick oil painting, gothic oil painting, fauvist oil painting, water color painting, gouache painting, pastel painting, color pencil sketch, pointillism, silkscreen, drawing, and air brush. However, the type of painting is not limited to the above examples and conversion to which features of painters such as van Gogh, Monet, and Picasso are added may be made selectable. Also, an algorithm of a different tone can be provided via the memory card 60 described later. The painting touch (such as the thickness of a brush) of the tone is also selectable.

The environmental information engine 400 is used to obtain environmental information by collecting approach information (human sensing information) of a person, the temperature, humidity, atmospheric pressure, and wind speed which are obtained by the sensor 40 and also position information obtained from a GPS controller 20 described later such as the latitude, longitude, and altitude, time information such as the year/month/day, time, and season, image information obtained from the image sensor 8, and weather forecast information and other information obtained from other sites via the Internet 500.

The face recognition engine 100, the photo-to-painting conversion engine 200, and the environmental information engine 400 are formed of an ASIC (Application Specific Integrated Circuit), DSP (Digital Signal Processor), or reconfigurable LSI (LSI that can be reconfigured by a program in a C language or the like) cooperating with the CPU 11.

The RAM 13 is a work memory in which the CPU 11 temporarily stores various kinds of data as necessary. The internal memory 14 is a hard disk or a large-capacity non-volatile memory such as a flash memory and in which, though details thereof will be described later, folders are formed so as to be able to store a large number of images. The address book 33 and a response log memory 300 are also included.

A display controller 16 causes the liquid crystal display panel 3 to display images and various menus by driving the liquid crystal display panel 3 based on display image data supplied from the CPU 11. A key input controller 17 inputs an operation signal of the touch panel 5 based on control of the CPU 11.

The touch panel 5 can be appropriately selected from many types such as the capacitance type, optical type, resistance film type, surface acoustic wave type, ultrasonic type, and inductive coupling type. Moreover, the function of fingerprint authentication or vein authentication can also be incorporated.

A memory card interface 18 is an input/output interface that controls input/output of data between various kinds of memory card 60 removably inserted into the memory card slot 6 and the CPU 11.

An imaging controller 19 controls capturing of an image of a subject by driving the image sensor 8. Image data captured as Bayer data is converted into YUV data and RGB data and then compressed into JPEG (Joint Photographic Experts Group) data before being written in the internal memory 14 or the memory card 60.

The GPS controller 20 acquires position information based on information received by the GPS antenna 7. Accordingly, the current position of the image processing apparatus 1 can be known.

A power supply controller 70 receives an AC power supply via a power supply plug 31 and converts the AC into a DC to supply power of a main power supply 71 or a standby power supply 72 to each unit.

The sensor 40 is a sensor to obtain environmental information, includes a human sensing sensor, line sensor, temperature sensor, humidity sensor, pressure sensor, wind speed sensor, and illumination sensor, and can obtain various kinds of environmental information in cooperation with the CPU 11, the face recognition engine 100, the environmental information engine 400, and the image sensor 8.

The sensor 40 detects whether any person is in the vicinity and if a state in which no person is in the vicinity lasts for a predetermined period or longer, controls the power supply controller 70 through the CPU 11 to automatically turn off the main power supply 71 to supply only the standby power supply 72 for power saving (auto power-off). If the sensor 40 detects that a person is in the vicinity again, the sensor 40 turns on the main power supply 71.

The sensor 40 can also measure the angle and distance of a viewer. Further, the sensor 40 recognizes the face of the viewer and can control the power supply depending on who the viewer is and can also detect who is viewing at which angle and whether the viewer is close or distant.

A communication controller 30 connects to the Internet 500 via a telephone line 31 or a wireless LAN 32 to exercise communication control including transmission/reception of mail and transmission/reception of content. The address book 33 is used for mail transmission/reception and provided in the internal memory 14.

The response log memory 300 is provided in the internal memory 14 to store a response log (history) of viewers based on results captured by the image sensor 8 and recognized by the face recognition engine 100, response results of the human sensing sensor 19, and touch results of the touch panel 5.

Figure 3:
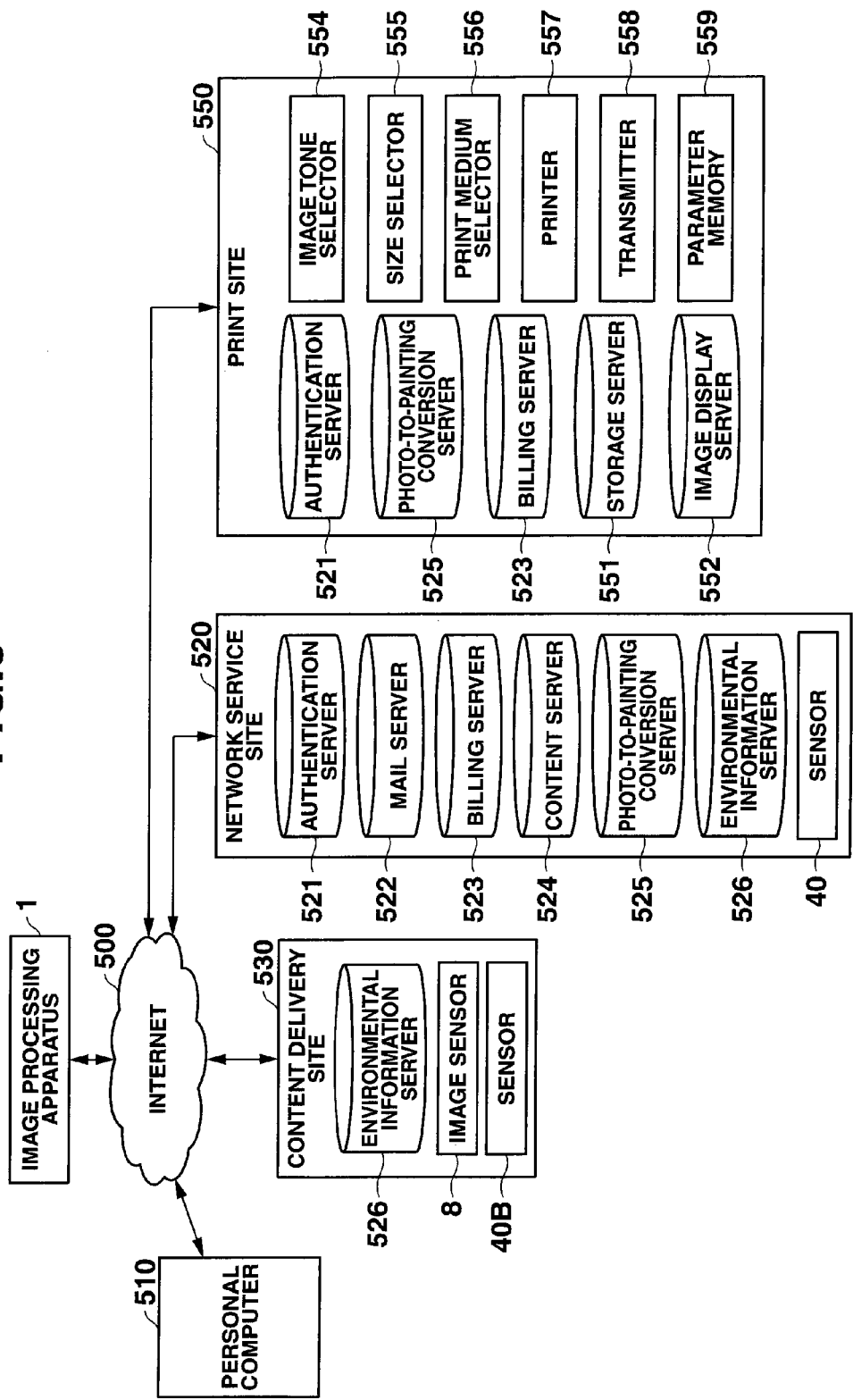
FIG. 3 is a conceptual diagram showing the configuration of a network system to which the image processing apparatus 1 according to the present embodiment is applied.

Next, FIG. 3 is a conceptual diagram showing the configuration of a network system according to the present embodiment. A personal computer 510 can connect to the image processing apparatus 1 via the communication controller 30 through the wireless LAN 32 or the like so that complicated settings that cannot be made by the image processing apparatus 1 can be made.

A network service site 520 is connected to the image processing apparatus 1 via the Internet 500 and includes at least an authentication server 521, a mail server 522, a billing server 523, a content server 524, a photo-to-painting conversion server 525, and an environmental information server 526. A sensor 40 is similar to the sensor 40 in FIG. 2. The network service site 520 also plays a role of a network provider of the display apparatus 1.

The authentication server 521 is used to authenticate an accessing person, the mail server 522 is used to manage transmission/reception of mail, and the billing server 523 is used to manage billing when images, music, programs and other content stored in the content server 524 are provided for a charge.

The photo-to-painting conversion server 525 is a server to which the photo-to-painting conversion engine 200 is given and the environmental information server 526 is a server to which the environmental information engine 400 is given.

Further, the environmental information engine 400 is also provided to the content delivery site 530. Accordingly, environmental information of a remote delivery content supply source can also be known from the image processing apparatus 1. The environmental information engine 400 is provided as a set together with the sensor 40.

The content delivery site 530 delivers various kinds of content which is to be displayed on the display apparatus 1. The content delivery site 530 has a large number of pieces of content and images and can deliver data to the image processing apparatus 1 or the network service site 520 via the Internet 500.

Examples of the content delivery site 530 include a live video content delivery site that delivers live video by setting up live camera video. Mountains, the sky, buildings or the like are always shot and dynamic images or still images are delivered to the network service site 520.

A print site 550 performs a photo-to-painting conversion of image data received via a network. The authentication server 521, the billing server 523, and the photo-to-painting conversion server 525 are similar to those in the network service site 520. Received image data is temporarily stored in a storage server 551 and a converted image converted by the photo-to-painting conversion engine of the photo-to-painting conversion server 525 is also temporarily stored therein.

Then, a converted image is printed on paper, a canvas, or other materials by a printer in the print site 550 or by placing an order with a print specialist.

An image display server 552 is used to perform interface processing for a user when image conversion processing is performed in the print site 550. That is, the image display server 552 controls the display to guide the user how to upload a photo of the user, how to select the painting tone type, how to select the print size, and how to select the print medium.

The above server configuration is only an example and a separate server may not always be needed for each type of processing.

Figure 4:
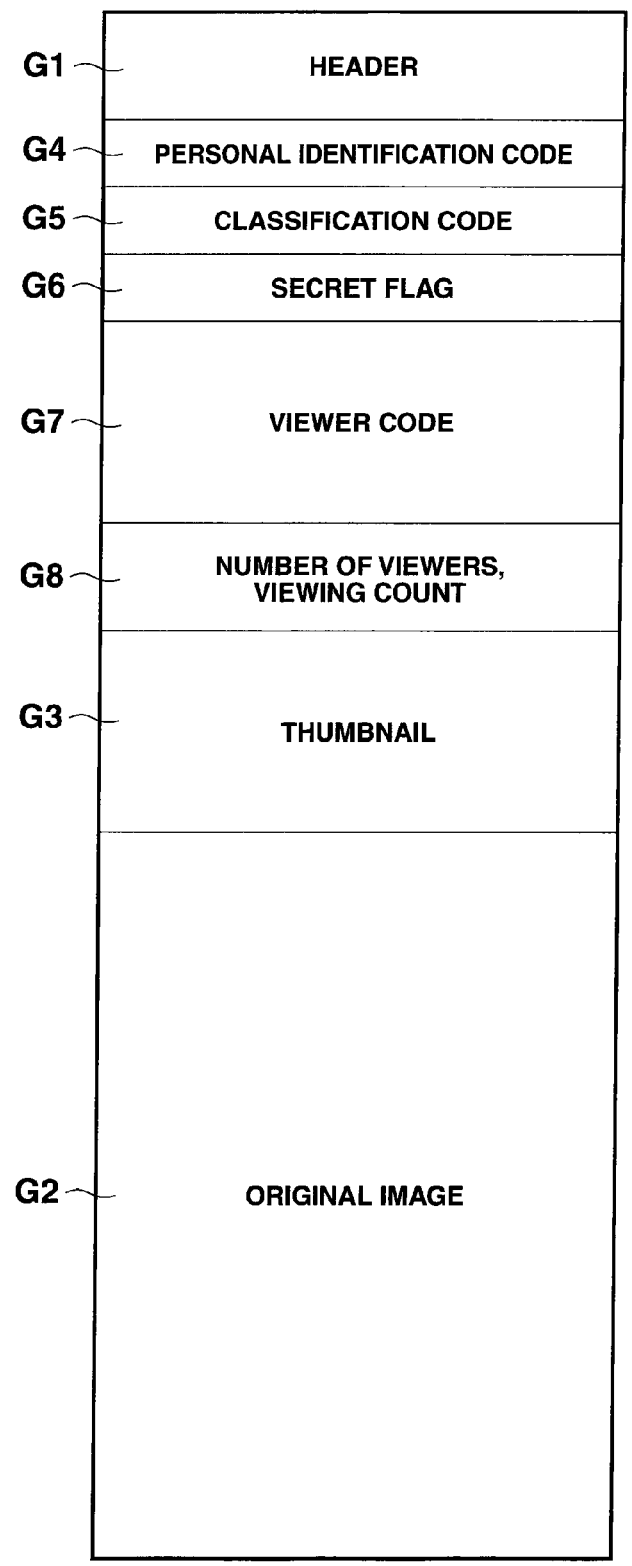
FIG. 4 is a conceptual diagram showing a structure of an image file stored in a memory card 60 of the display apparatus 1 according to the present embodiment.

FIG. 4 is a conceptual diagram showing a structure of an image file stored in the memory card 60 of the display apparatus 1 according to the present embodiment. Each image file contains a header G1 having data such as EXIF (Exchangeable Image File Format), original image data G2, which is a photographed image, and thumbnail image data G3, which is a reduced image of the original image data G2. Because the size of the reduced image to be displayed in a screen is different depending on the size of the display screen, a preview image for the display may be created and stored separately from the thumbnail. In the present embodiment, preview images are included in the meaning of thumbnails.

Figure 1B:
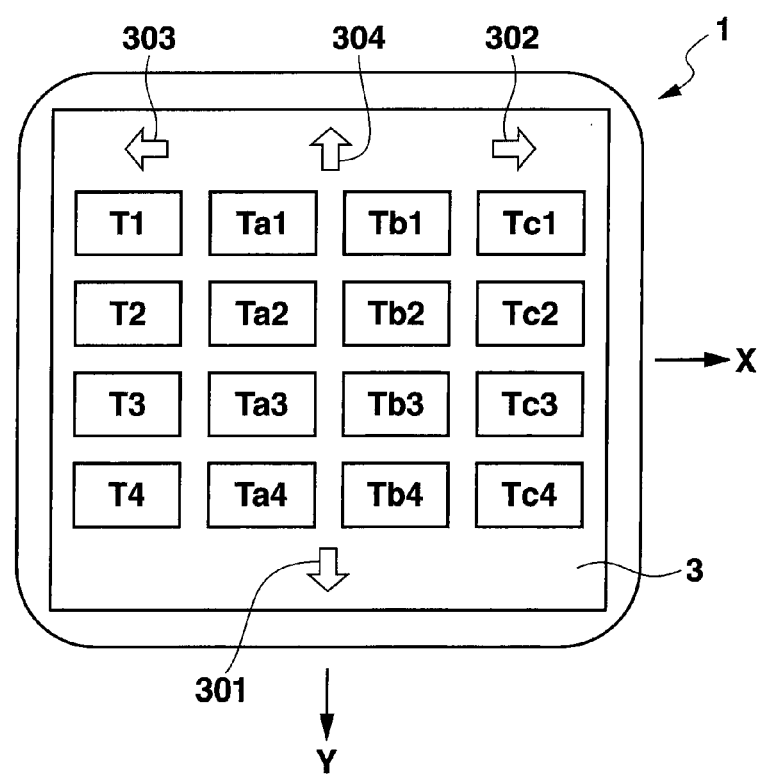
FIG. 1B is a diagram showing a display example of an image processing apparatus 1 according to the present embodiment.

Sixteen thumbnails are displayed in one screen in FIG. 1B, and a thumbnail (preview image) of the same number of pixels as that of the liquid crystal display panel 3 is prepared. The number of pixels of the original image G2 depends on the digital camera used for capturing and XGA (1024×768), SXGA (1280×1024), UXGA (1600×1200), QXGA (2048×1536), and the like are known and a digital camera of 10 million or more pixels has 4000×3000 pixels or more. If the liquid crystal display panel 3 has, for example, 800×600 pixels, a preview image (thumbnail) of 800×600 pixels is prepared. One thumbnail in FIG. 1B has about 160×120 pixels and may be prepared in the thumbnail image data G3 in advance or the original image may be reduced when displayed.

That is, an image file conforms to a file format of a common digital camera and an SD card (memory card 60) used in the digital camera has only to be inserted into the memory card slot 6 to use the image file. As image file formats, various formats such as JPEG, GIF (Graphics Interchange Format), AVI (Audio Video Interleave), and PNG (Portable Network Graphics) can be supported when appropriate.

Below is data specific to the present embodiment. First, G4 is a personal identification code indicating a person who has performed an image storage operation and the person is identified by face recognition. The identification code is allocated to each individual like, for example, "1001" to father and "1002" to mother.

G5 is a classification code that indicates the use of the image and is classified into a business use, private use and the like. The classification code, for example, "01" for business use, "02" for private use, and "03" for travel use are recorded. This classification can freely be arranged for photos of the user.

G6 is a secret flag indicating whether to set the image as secret. If the image should be set as secret, "1" is set and otherwise, "0" is set.

G7 is a viewer code indicating the person viewing the displayed image. The viewer is identified by face recognition of the person captured by the image sensor 8 while the image is displayed. If the person is already registered, the identification code of the person is recorded as the viewer code and if the person is a new non-registered person, a new viewer code is issued for recording.

G8 stores the viewing count for each viewer. G7 and G8 are shown separately for the sake of convenience, but the viewer code and the viewing count are stored as a set. That is, if Mr. X has viewed the image twice, Mr. X's viewer code "1101"×2 is recorded and if Mr. Y has viewed the image three times, Mr. Y's viewer code "1052"×3 is recorded.

Figure 5:
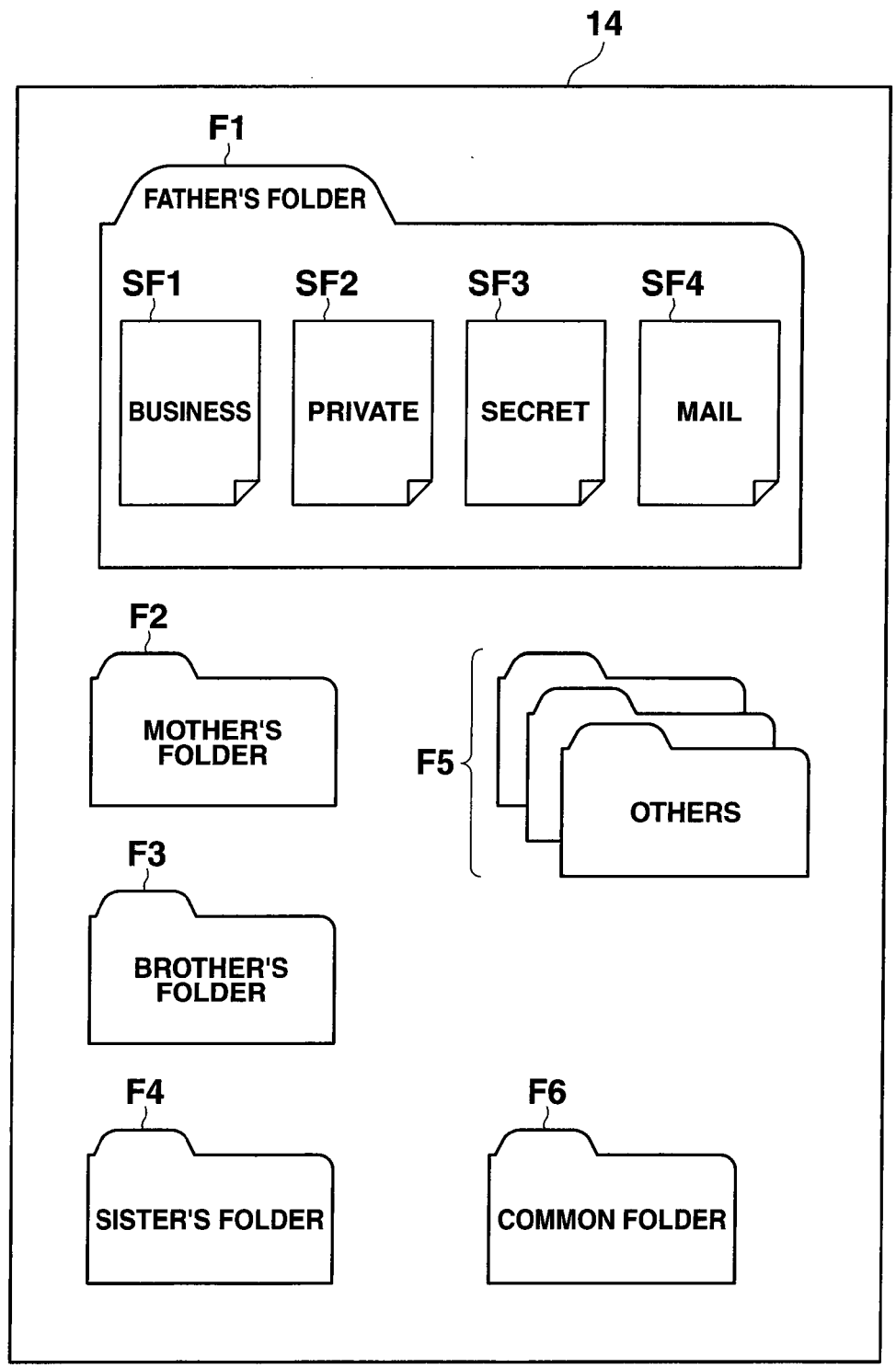
FIG. 5 is a conceptual diagram showing a folder configuration inside an internal memory 14 of the display apparatus 1 according to the present embodiment.

FIG. 5 is a conceptual diagram showing a folder configuration inside the internal memory 14 of the display apparatus 1 according to the present embodiment. In the present embodiment, folders for each individual recognized by image recognition are created in the internal memory 14. The configuration of one image file is shown in FIG. 4, but basically a folder is created for each personal identification code G7 of the image file. For example, a folder F1 corresponding to the identification code "1001" of the father, a folder F2 corresponding to the identification code "1002" of the mother, . . . are created. A sub-folder SF is created inside an individual's folder in accordance with the classification code G5 of an image file or for an image file to which a secret flag is attached. For example, a business sub-folder SF1, a private sub-folder SF2, a sub-folder SF3 to which a secret flag is set, and a sub-folder SF4 for images received by e-mail are formed. These folders are logical folders and a memory area thereof is not physically segmented.

FIG. 6 is a conceptual diagram showing the configuration of the address book 33 in the internal memory 14 of the display apparatus 1 according to the present embodiment. A region 331 stores mail address information called a profile of the owner and a region 332 stores mail address information of senders/receivers from/to whom mail is received/transmitted. An area M2 stores mail addresses and an area M1 stores names of the owners of the mail addresses. Names can freely be given. An area M3 stores face images of individuals of the mail addresses. An area M4 stores the above personal identification codes. An area M5 stores other various kinds of information, for example, addresses, incoming mail blocking and the like are recorded when appropriate.

Concrete operations of the image processing apparatus 1 and a network system according to the present embodiment will be described below with reference to flowcharts. Flowcharts are represented along operation procedures of an operator to make the description easier to understand and accordingly, circuits and data movement will be described.

Figure 7:
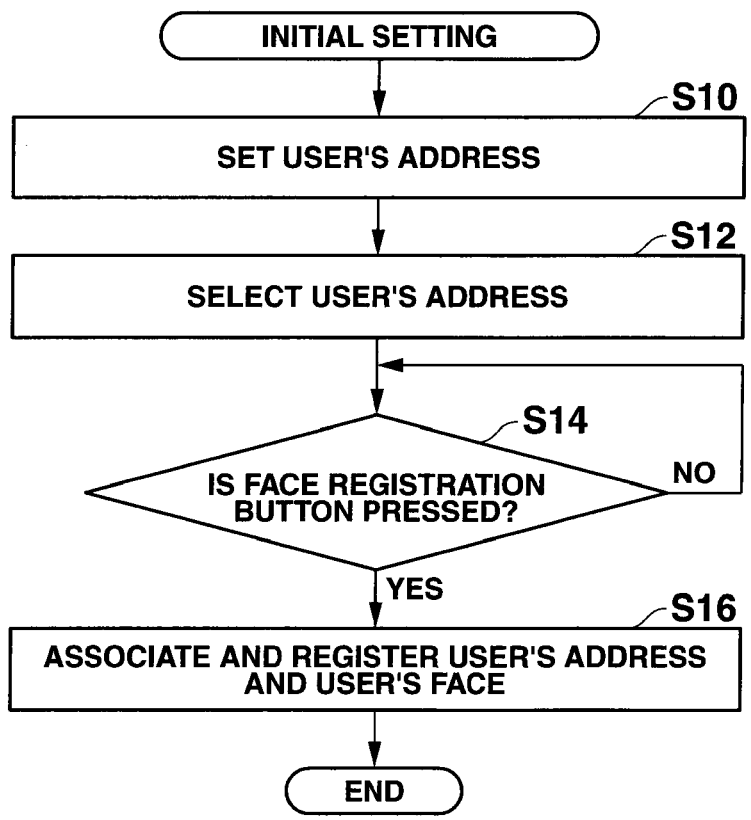
FIG. 7 is a flowchart showing a procedure for associating and registering a user's face and a user's mail address during initial settings of the image processing apparatus 1 according to the present embodiment.

FIG. 7 is a flowchart showing a procedure for associating and registering a user's face and a user's mail address during initial settings of the image processing apparatus 1 according to the present embodiment. First, the mail address of a user is set (step S10). The method of setting the mail address of the user will be described. When initially activated, the image processing apparatus 1 and the authentication server 521 are connected via a network and when authenticated, a unique mail address is issued and granted to the image processing apparatus 1 by the mail server 522. The personal computer 510 accesses the mail server 522 to change the unique mail address to a desired mail address. When this mail address is made known to the family or friends, image mails can be transmitted/received. This is basically the same as address initial settings of a personal computer or mobile phone.

Next, the user (user including the owner, two or more users permitted) of the image processing apparatus 1 registers the user's face. The image sensor 8 almost always captures an image while the power supply is ON and, if the user touches a face registration button displayed in the liquid crystal display panel 3 on the touch panel 5 (step S14) while the user's mail address is displayed in the liquid crystal display panel 3 (step S12), the CPU 11 recognizes the user's face through the face recognition engine 100 and associates the user's mail address with the user's face for registration in the address book 33 (step S16).

Figure 8:
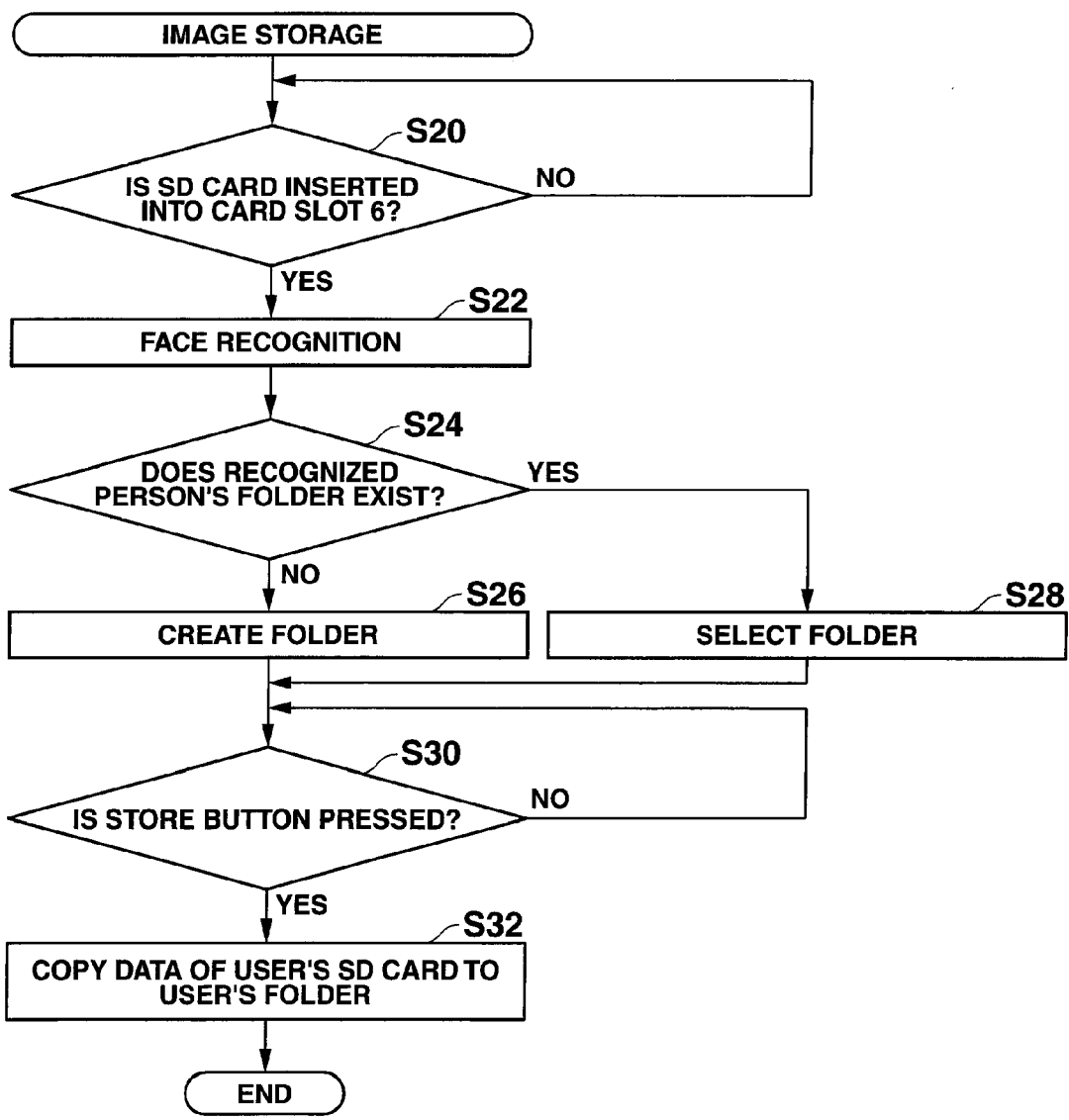
FIG. 8 is a flowchart showing the procedure for storing an image stored in the memory card 60 in the internal memory 14 in the image processing apparatus 1 according to the present embodiment when the memory card 60 such as an SD card is inserted into a memory card slot 6.

FIG. 8 is a flowchart showing the procedure for storing an image stored in the memory card 60 in the internal memory 14 of the image processing apparatus 1 according to the present embodiment when the memory card 60 such as an SD card is inserted into the memory card slot 6. First, whether the memory card 60 is inserted into the memory card slot 6 is determined (step S20) and when the memory card 60 is inserted into the memory card slot 6, the CPU 11 recognizes the face of the user captured by the image sensor 8 at this point by using the face recognition engine 100 (step S22).

Next, whether the personal identification code G7 of the recognized face is registered is determined (step S24). That is, as shown in FIG. 5, a folder is formed corresponding to the personal identification code G4 and thus, whether the folder of the recognized person is present is determined. If the user is, for example, a new non-present user, a new recognition code is issued and the face is registered and also a folder is created (step S26). On the other hand, if the operating user is the father of the identification code "1001", the folder F1 is selected (step S28). Storage of an image of a non-registered user may be made impossible.

Next, whether the store button displayed in the liquid crystal display panel 3 is pressed is determined (step S30) and if the store button is pressed via the touch panel 5, images recorded in the memory card 60 are copied to the relevant folder (S32). That is, the user (operator) can store images in the user's folder without being aware thereof. Then, a sub-folder based on the classification in the folder can be created according to the menu or a secret flag can be set if necessary.

FIG. 9 is a flowchart showing the procedure when an e-mail is received by the image processing apparatus 1 according to the present embodiment. When no mail address of the image processing apparatus 1 is set thereto, e-mails cannot be received. When the mail address thereof is set, for example, if received with the mail address of the father (father@*.*.jp) (step S40), whether the folder corresponding to the received mail address is present is determined (step S42). If the corresponding folder is determined not to be present, the received e-mail is stored in a common folder F6 (step S44). On the other hand, if the corresponding folder, for example, the folder F1 corresponding to the mail address of the father is determined to be present, the e-mail is stored in the corresponding folder F1 and if an image is attached to the mail, the image is stored in the sub-folder SF4 for image mail (step S46).

FIG. 10 is a flowchart illustrating a reproduction operation of the image processing apparatus 1 according to the present embodiment. Reproduction includes cases when images stored in the internal memory 14 are reproduced, when images stored in the inserted memory card 60 are reproduced, only one image is reproduced, and images are reproduced as a slideshow.

If the user (operator including a registered user and a non-registered user) comes to the front of the image processing apparatus 1 to reproduce images, the image sensor 8 captures an image of the user and the CPU 11 and the face recognition engine 100 work together to recognize the face of the operator (step S50), determine whether any reproduction operation has been performed (step S52), and when a reproduction operation is performed, determine whether the user of the recognized face is registered (step S54). If the user of the face is registered, the operator can be presumed to be a user of the image processing apparatus 1 and thus, images stored in the corresponding folder, for example, the folder F1 of the father if the recognized face is the father's face and images stored in the common folder F6 are made reproducible (step S56). Folders of others, for example, the folder F2 of the mother and a folder F4 of a sister cannot be reproduced as one pleases. On the other hand, if the user of the face is not registered, only images stored in the common folder F6 are made reproducible (step S58). Then, a predetermined reproduction operation is performed after proceeding to step S60.

The face recognition engine 100 can recognize faces of plural users captured in an image and thus, if the mother is captured together with the father, content of the folder F2 of the mother is also made reproducible.

The control when faces of plural users are recognized and registered and non-registered users are included will be described later.

FIG. 11 is a flowchart showing the procedure for slideshow reproduction during the reproduction operation of the image processing apparatus 1 according to the present embodiment. When a reproduction operation corresponding to step S52 in FIG. 10 is present is determined (step S70), whether the reproduction operation is a slideshow is determined (step S72). If the reproduction operation is not a slideshow, the processing proceeds to other processing.

If the reproduction operation is a slideshow, on the other hand, the first image is first read (step S74). Methods of slideshow reproduction include specific folder reproduction, reproduction in chronological order, reproduction in reverse chronological order, and random reproduction. Next, the face of the viewer (including a registered user and a non-registered user) currently viewing is recognized (step S76). Then, whether the recognized face is any face of viewers who viewed previously is determined (step S78). As shown in FIG. 4, the viewer code G7 is prepared for each image and once an image is viewed, the viewer code G7 and the viewing count G8 are registered as a set.

If the recognized face is determined not to be any face of viewers who viewed previously, images to be reproduced are images the face-recognized viewer has not viewed and thus, the images are displayed (step S80), a viewer code is issued, the face image is registered and an addition of the viewing count is made (step S82). On the other hand, if the recognized face is determined to be the face of a viewer who viewed the image previously, images to be reproduced are images the face-recognized viewer has viewed and thus, steps S80 and S82 are skipped to proceed to step S84.

Next, whether there is any interrupt is determined (step S84). That is, whether the viewer currently viewing changes or whether a new viewer is added during display of the image is determined. In the present embodiment, while face recognition is performed before the image to be displayed is selected, the same image continues to be displayed for several seconds in a slideshow and cases when the viewer disappears, increases, or changes can naturally be considered in the meantime.

Here, measures taken when it is not suitable if a displayed image is viewed by other than a specific person or the owner are considered. If, for example, the face of a person other than the family is detected, that is, there is an interrupt, the display is stopped or another image is read to switch the images (step S86). A specific image for switching may be prepared in advance. The interrupt processing is represented in this position of the flowchart for the sake of convenience, but may be made to be able to accept an interrupt signal at any time.

Also, when a new viewer other than the owner joins while an image read from the sub-folder SF3 to which the secret flag is set is displayed, the processing may proceed to step S86 to stop the display or read another image to switch the images.

Then, whether the end of processing is instructed is determined (step S88) and if the end of processing is not instructed, the processing returns to step S74 to read the next image to repeat the above processing. On the other hand, if the end of processing is instructed, the processing ends.

That is, according to the present embodiment, when a slideshow is displayed, the viewer may get tired of viewing the slideshow because the same images are repeated if the slideshow continues for a long time. Thus, by recognizing the face of a viewer, images the viewer has not yet viewed are displayed.

Though details are not shown in the flowchart shown in FIG. 11, if there is plural viewers, the order of priority is set as: an image nobody has viewed>a viewer who has not yet viewed an image is included>all have viewed an image. That is, an image nobody has viewed is classified as the first priority, an image a viewer among viewers has not yet viewed is classified as the second priority, and an image all have viewed is classified as the third priority.

First, images belonging to the first priority are displayed as a slideshow and after images belonging to the first priority are all displayed, images belonging to the second priority are displayed as a slideshow. When images belonging to the second priority are all displayed, images belonging to the third priority are displayed as a slideshow and after images belonging to the third priority are all displayed, images belonging to the first priority are displayed again as a slideshow.

The above processing is an operation performed when the number of viewers or members at any moment does not change, and each time the number of viewers or members changes, the classification of the first, second, and third priorities changes anew.

Further, images to which the secret flag G6 is attached are excluded from the display from the beginning. Such images may be displayed only if the viewer is recognized as the owner of the images by face recognition and when another face is detected in step S84, the display is immediately stopped in step S86.

Images displayed according to the flowchart in FIG. 10 or 11 are images whose tone is not converted and images whose tone is converted have no limitations imposed thereon and can be displayed as a slideshow. In this case, for example, on condition that the slideshow mode is set, images in a specific folder may be displayed after photo-to-painting conversion, images may be displayed after photo-to-painting conversion in chronological order or in reverse chronological order, or images may be displayed after random photo-to-painting conversion.

B. Image Processing System in the Present Embodiment

Next, an image delivery system in an embodiment of the present invention will be described.

The present embodiment describes an embodiment of an image delivery system. FIG. 12 is a block diagram exemplifying a content delivery service by a network regarding an image delivery system according to the present embodiment. Reference numeral 1 denotes the image processing apparatus in FIG. 2, reference numeral 520 denotes the network service site in FIG. 3, and reference numeral 530 denotes the content delivery site in FIG. 3.

Content is delivered from the content delivery site 530 and, as shown in FIG. 12, the content includes plural pieces of still image data, character data for subtitles, and audio data. The content is basically placed in the content server 524 from the content delivery site 530. Then, the content is displayed in the liquid crystal display panel 3 of the image processing apparatus 1. Only still images may be displayed, subtitle characters may be displayed thereon, or sound or music may also be played.

Figure 13:
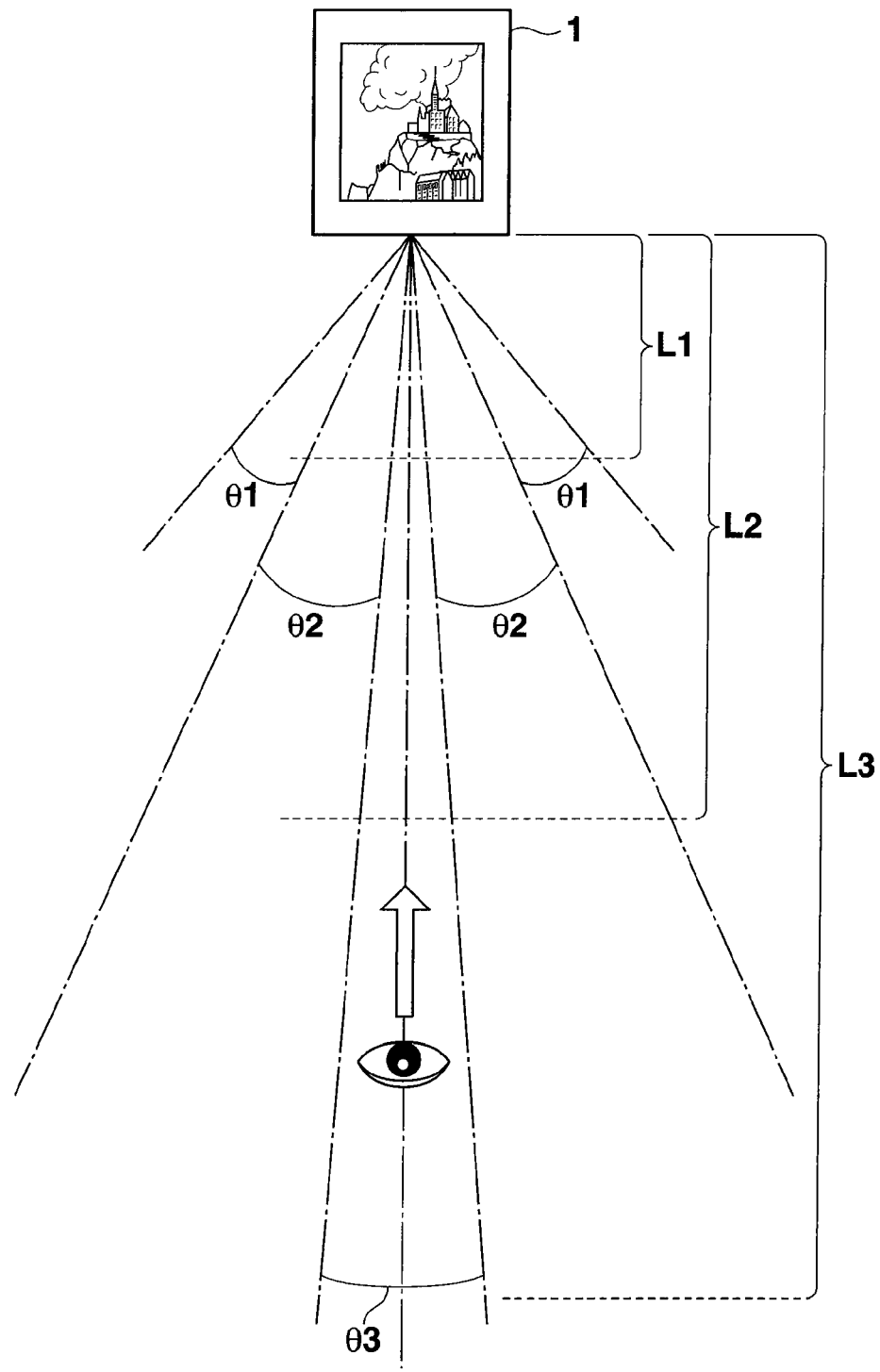
FIG. 13 is a conceptual diagram illustrating an analysis of log information according to the present embodiment.

FIG. 13 is a conceptual diagram illustrating an analysis of log information. The CPU 11 analyzes an image of the user (viewer) captured by the image sensor 8 to calculate viewing angle information and distance information of the viewer viewing the image displayed in the liquid crystal display panel 3. As described with reference to FIG. 4, the viewing count of the viewer can be counted for each image or each piece of content based on the face recognition. Here, the concept of an interest index is introduced.

In FIG. 13, the CPU 11 determines angle ranges $\theta1$, $\theta2$, $\theta3$ between viewers and the image processing apparatus 1 from imaging results by the image sensor 8 and also determines distances L1, L2, L3 of viewers from the image processing apparatus 1. Then, the CPU 11 analyzes the degree of attention of the content based on the angle and distance and reflects the degree of attention in log information as an interest index.

If, in addition to the viewing time and viewing count, the viewer's face, and distance, angle, and movement with respect to the liquid crystal display panel 3 are recognized, various interest indexes can be acquired.

As movement with respect to the liquid crystal display panel 3, for example, a change from the angle range $\theta1$ to the angle range $\theta3$ of the viewer with respect to the liquid crystal display panel 3 or a change from the distance L3 to the distance L2 of the viewer with respect to the liquid crystal display panel 3 based on face recognition when focused on content is reflected in log information as an interest index in the content through an algorithm.

Faces of a family may be recognized in advance so as to reflect information about who viewed what content for how long in log information. Alternatively, expressions of a family may be recognized in advance so as to reflect information about responses (laughing, showing interest, or being surprised) when the content is viewed. Further, visiting circumstances of a family at the installation location of the image processing apparatus 1 such as one day, one week and so on may be reflected in log information. Moreover, in addition to recognition information, operations such as whether preferences are registered and a full-screen display is set may be reflected as interest indexes.

Figure 14:
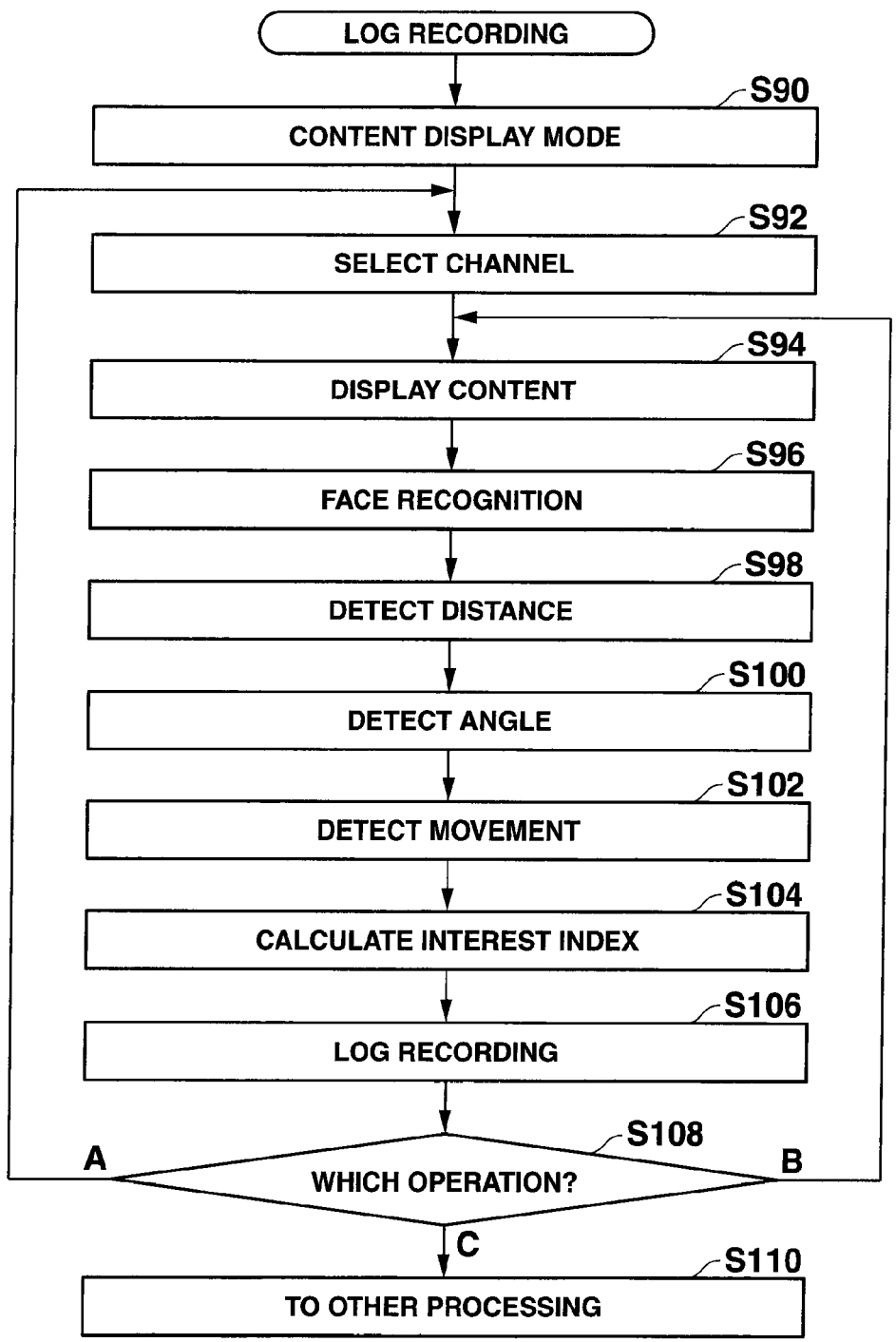
FIG. 14 is a flowchart showing an outline operation of log recording by the image processing apparatus 1 according to the present embodiment.

FIG. 14 is a flowchart showing an outline of an operation of log recording by the image processing apparatus 1 according to the present embodiment. Under the assumption that the image processing apparatus 1 is connected to a network via a wireless LAN or the like, the CPU 11 sets the content display mode (step S90). In the content display mode, content delivered from the content delivery site 530 is received and displayed and examples thereof include a weather forecast channel, fashion channel, dressing proposal channel, stock price channel, and live camera channel. As described with reference to FIG. 12, content information is temporarily placed on the content server 524 of the network service site 520 and then downloaded to the image processing apparatus 1 via the communication controller 30.

Then, the CPU 11 causes the user to select a desired channel (step S92). If the user selects a channel, the CPU 11 displays a predetermined page of the selected channel (step S94). The image sensor 8 basically captures an image at all times and the face of the operator (viewer) is recognized by the face recognition engine 100 (step S96). Then, the CPU 11 determines the distance to the viewer and the angle from the vertical direction (front direction when viewed from the screen) indicating the viewing direction of the viewer through operations (step S98, step S100). Further, if the recognized face moves, the movement distance and angle are detected (step S102).

As described with reference to FIG. 13, if the viewing direction of the viewer changes from the angle range $\theta1$ to the angle range $\theta3$, the interest index is deemed to be high because the viewer moved diagonally to the front. If the distance between the image processing apparatus 1 and the viewer changes from the distance L3 to the distance L1, the interest index is also deemed to be high because the viewer has moved closer to the screen.

The CPU 11 unifies the above information to calculate the interest index (step S104). Various methods of calculating the interest index can be considered and, for example, the interest index in the content of the "father" of the personal identification code "1001" depends on the "viewing count", "viewing time", "viewing distance", "viewing angle", "movement conditions while viewing", "preference registration operation", and "full-screen display operation". The above information is recorded in the response log memory 300 as log information (step S106).

In this state, whether any operation is performed is determined (step S108) and if, for example, a selection operation of another channel (operation A) is performed, the processing returns to step S92. If an operation to specify a different screen of the same channel (operation B) is performed, the processing returns to step S94. If any other operation (operation C) is performed, the processing proceeds to the necessary processing flow according to the operation (step S110).

The log information is important information for the network service site 520 to decide which content to purchase and how the display should appear. For the content delivery site 530, the log information is important information to create content and decide a billing amount. Further, content can automatically be displayed in which the person recognized by face recognition of a viewer is interested.

Figure 15:
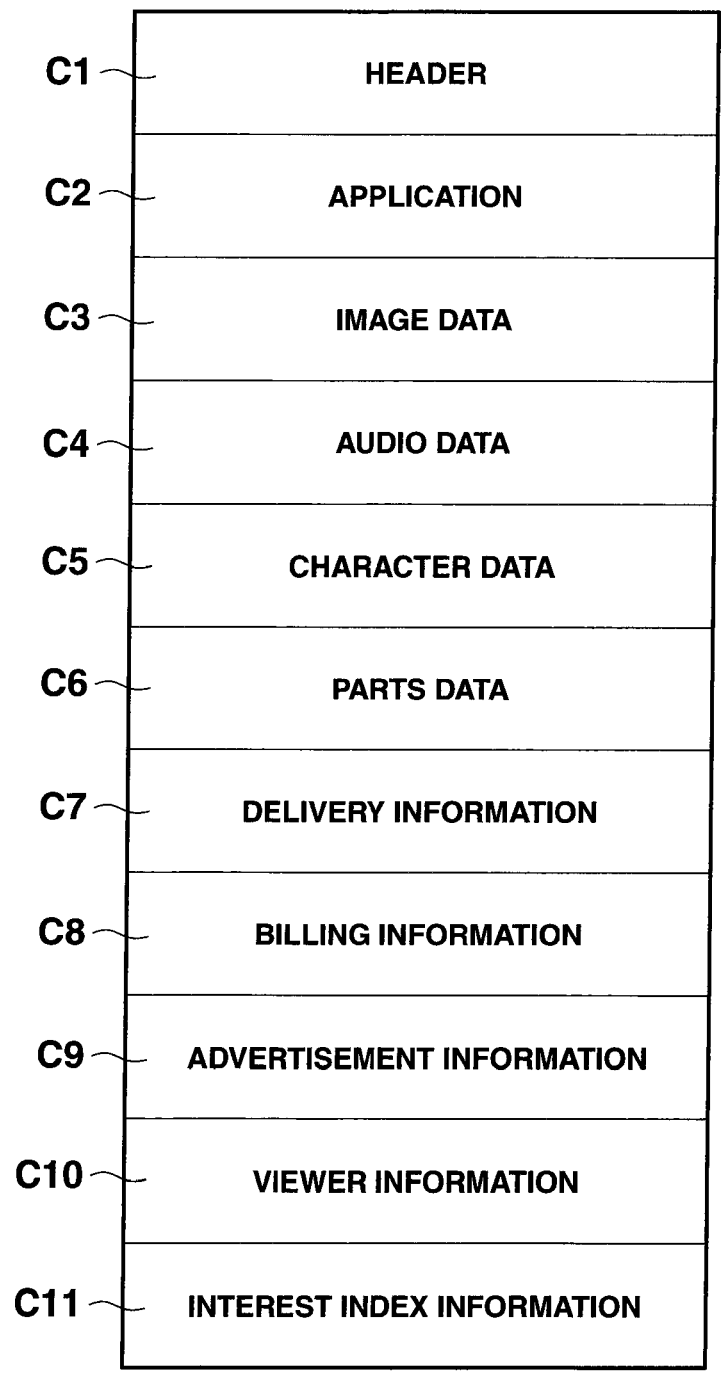
FIG. 15 is a conceptual diagram exemplifying a file configuration of content delivered from a content delivery site 530 and temporarily stored on a content server 524 of a network service site 520 according to the present embodiment.

FIG. 15 is a conceptual diagram exemplifying a file configuration of content delivered from the content delivery site 530 and temporarily stored on the content server 524 of the network service site 520. A header C1 stores data indicating features of a content file such as delivery company information, the data type, and the data size. An application C2 stores a program when the content is operated by the program. For example, the application is Adobe Flash (registered trademark of Adobe Systems), JAVA (registered trademark of Sun Microsystems) and so on. A data portion is the main portion of the content which is actually displayed and includes image data C3, audio data C4, character data C5 containing, as shown in FIG. 12, subtitles, and part data C6 used by the application C2. Delivery information C7 includes the delivery destination and delivery time. The content also includes billing information C8 for charged content, advertisement information C9 when advertisements are contained, viewer information C10 including the personal identification code, which is a recognition result, and interest index information C11 calculated from, as described above, the "viewing count", "viewing time", "viewing distance", "viewing angle", "movement conditions while viewing", "preference registration operation", and "full-screen display operation". The viewer information C10 and the interest index information C11 are stored in the response log memory 300 together with the header C1.

While authentication by the image sensor is performed in the present embodiment, fingerprint authentication or vein authentication technology may be provided on the touch panel 5 or in a button portion. An example of log information analysis by fingerprint authentication or vein authentication is as follows:

For example, a personally allocated button may be prepared to analyze information such as computerization of time zones of channel selection, whether advertisement windows are closed, and further, whether detailed information is viewed, whether detailed information is downloaded, selection conditions of windows of guidance information issued by the content delivery site, and who pressed the pause button or download button of image on which content as log information incorporated into the interest index.

Next, an example in which a photo-to-painting conversion in accordance with environmental information is made will be described.

The photo-to-painting conversion is, as described above, to convert an image such as a photo into a so-called painting tone image or painting style image such as an oil painting, thick oil painting, gothic oil painting, fauvist oil painting, water color painting, gouache painting, pastel painting, color pencil sketch, pointillism, silkscreen, drawing, and air brush. The tone and the image style have similar meanings and the image style is a more pictorial expression, but there is no technical difference therebetween.

Image processing technology basically performs a conversion to create a painting tone by adjusting/combining parameters of various types of effect processing (filter processing) as used in photo retouching software.

Parameters are elements to perform effect processing on pixels. That is, a pixel is generally represented by gradations of plural bits for each of RGB and parameters are elements to perform operations on the bit data. A concrete example will be described below. When, for example, red is emphasized, operations like R×2, G×0.9, and B×0.5 are performed and the above "2", "0.9", and "0.5" are parameters. Alternatively, if operation elements are programmed in advance and operations like R×1.1 when the emphasis level of red is 1, R×1.2 when the emphasis level is 2, and R×1.3 when the emphasis level is 3 are performed, these emphasis levels are parameters.

Predetermined operations may be performed between an attention pixel and adjacent pixels thereto. When, for example, pixels P1 (R, G, B), P2 (R, G, B), P3 (R, G, B), P4 (R, G, B), P5 (R, G, B), P6 (R, G, B), P7 (R, G, B), P8 (R, G, B), and P9 (R, G, B) are arranged vertically and horizontally around a certain pixel P5 (R, G, B), an operation is performed on P5 (R) like P5 (R)=P1 (R)×n1+P2 (R)×n2+P3 (R)×n3+P4 (R)×n4+P5 (R)×n5+P6 (R)×n6+P7 (R)×n7+P8 (R)×n8+P9 (R)×n9 and a similar operation is also performed for G and B. Each "n" is a parameter and different effect processing can be performed by changing the numerical values (coefficients) thereof.

Effect processing and painting conversion processing are highly complex operations performed on pixels programmed in advance.

Examples of the effect processing include (a) texture processing that gives a special feel by mapping a texture onto an image; (b) resolution processing that enhances a feel and a sense of resolution by dividing an image into a contour, a texture portion such as a fine pattern, and a flat portion and performing appropriate processing on each; (c) HSV processing that adjusts the color by dividing the color into three elements of the hue, saturation, and value; (d) RGB processing that adjusts the degree of each color of R (red), G (green), and B (blue); (e) RGB replacement processing that makes a replacement in the direction of R to G, and G to B; (f) edge extraction processing that applies a filter called a Laplacian filter; (g) intermediate density extraction processing that applies a filter called a median filter; (h) equalize processing that extracts an RGB histogram of adjacent pixels to cause the histogram between pixels to distribute appropriately to make contrast corrections or stretch the histogram of an image; (i) gamma correction processing that adjusts intermediate brightness while maintaining a bright portion and a dark portion; (j) shadow processing that makes a dark region of an image brighter or a bright region darker; (k) solarization processing that inverts, when brighter than a threshold, RGB values of pixels; and (l) noise addition processing that randomly draws dots to generate noise and adjust the noise amount and color.

Effect processing that makes the touch (touch of brush) different is also known.

More specifically, highly correlated pixels are collected from pixels constituting image data by using the color or the like as a reference to form groups. Subsequently, the color of pixels in the same group among pixels in each group is replaced by the representative color of the group. Groups of pixels whose color is replaced by the representative color form respective touches of brush. According to the image processing, a formed touch of brush can be changed by changing the method of correlating pixels collected as a group and the shape (length (distance), oblateness) of the group constituted of pixels of the same color (representative color) and, as a result, the tone of an image represented by image data can be changed to various painting tones. For each of various tones, an optimal combination of parameters such as the degree of correlation, the length representing the group shape, and oblateness used for processing is set and this information is stored in the parameter memory 410. The photo-to-painting conversion engine 200 makes changes to various tones based on information stored in the parameter memory 410.

Changing each of plural pieces of image data into different touches of brush can be realized by adjusting the shape of a group, for example, oblateness of a group collecting pixels constituting the touch of brush. If the oblateness of a group constituted of pixels of the same color representing the touch of brush is increased, the touch of brush becomes thicker and, as a result, the touch of an image is displayed roughly. If the oblateness of a group constituted of pixels of the same color is decreased, a small touch of brush can be created and, as a result, the touch of an image is displayed finely.

Figure 16:
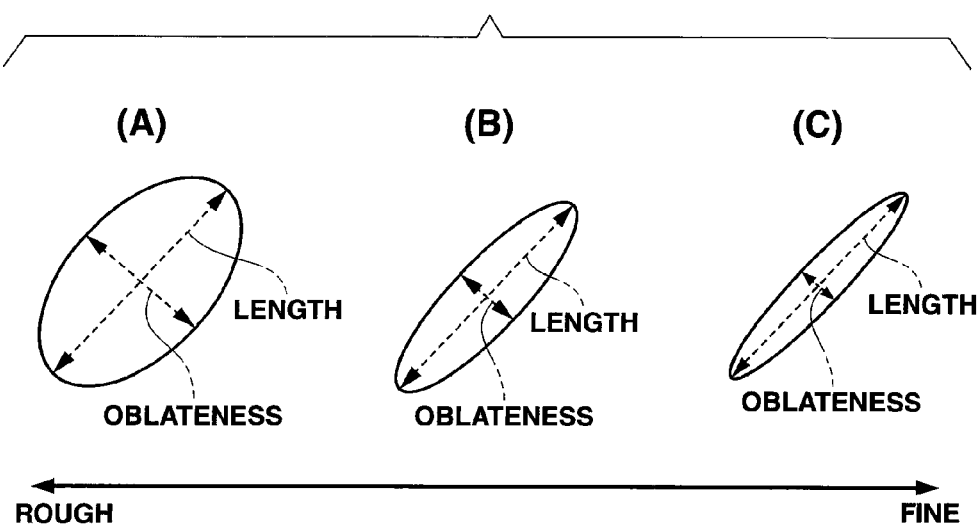
FIG. 16 is a diagram showing states of painting touches according to the present embodiment.

FIG. 16 shows an example of the group of pixels representing the touch of brush generated in this manner. For example, if, as shown in (A) of FIG. 16, the oblateness of a group constituted of pixels of the same color representing the touch of brush is increased, the touch of brush becomes thicker and, as a result, the touch of an image is displayed roughly. If, as shown in (C) of FIG. 16, the oblateness of a group constituted of pixels of the same color is decreased, a small touch of brush can be created and, as a result, the touch of an image is displayed finely. The group shown in (B) of FIG. 16 represents a standard touch of brush.

Figure 17:
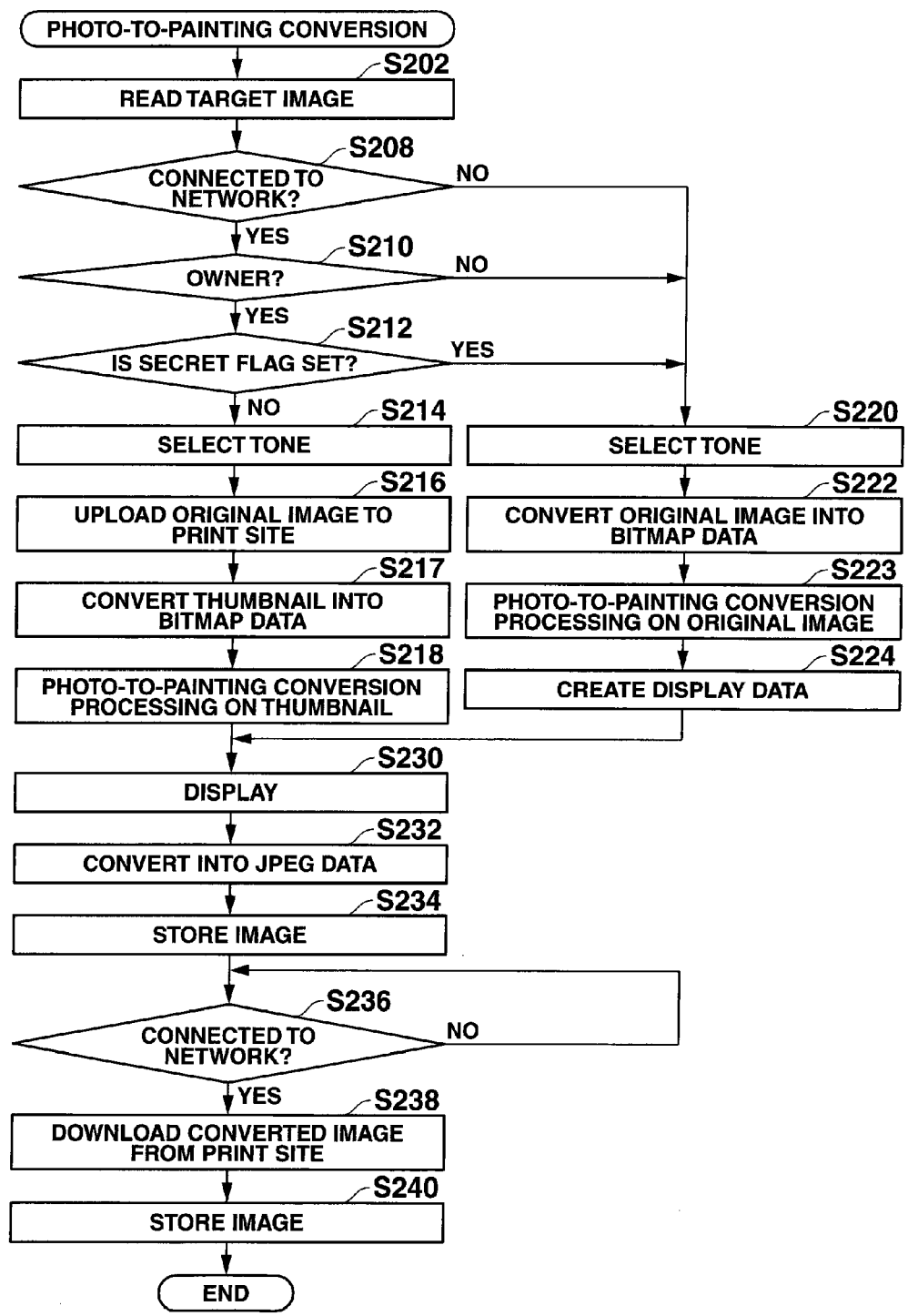
FIG. 17 is a flowchart showing the procedure for converting a painting according to the present embodiment.

FIG. 17 is a flowchart showing an outline of photo-to-painting conversion. First, a target image whose tone should be converted is read from the memory card 60 into the RAM 13 (step S202).

Then, whether the image processing apparatus 1 is connected to a network, that is, the image processing apparatus 1 is connected to the print site 550 (see FIG. 3) via the communication controller 30 and the Internet 500 and also via the network service site 520 is determined (step S208).

If the image processing apparatus 1 is determined to be connected to the print site 550, the processing proceeds to step S210 to determine whether the currently operating user is the owner of the image processing apparatus 1.

That is, whether the operator captured by the image sensor 8 and recognized by the face recognition engine 100 is the owner such as the father or the mother registered in FIG. 6 is determined and if the operator is determined to be the owner, the processing proceeds to step S212. This is intended to prevent image data from being leaked from the image processing apparatus 1 and uploaded to a network by anyone other than the owner.

Further, in step S212, whether the secret flag G6 is set to the image whose tone should be converted is determined. This is also intended to prevent a secret image from being uploaded to a network inadvertently.

If the secret flag G6 is not set, the processing proceeds to step S214 to select the tone to be converted into such as an oil painting tone, water color painting tone, and pastel painting tone. Various parameters are programmed in advance for each tone and the parameters are read from the parameter memory 410 to set the parameters.

Then, the original image and the type of tone are uploaded to the print site 550 (step S216). More correctly, the original image and the type of tone are uploaded to the print site 550 via the network service site 520. This is because the provider of the image processing apparatus 1 is the network service site 520. Uploading of the type of tone may also depend on arrangement with the print site 550, and simply information of "oil painting tone" is sent or a predetermined parameter corresponding to the type of tone is sent.

Then, after conversion into bitmap data to make adjustments of R (red), G (green), and B (blue) for each pixel of a thumbnail in step S217, photo-to-painting conversion processing is performed on the thumbnail (step S218). That is, photo-to-painting conversion processing is performed on the thumbnail, which is the target image, with the parameters set above. Then, the processing proceeds to step S230.

On the other hand, if the image processing apparatus 1 is determined not to be connected to a network in step S208, the processing proceeds to step S220 to select, like in step S214, the tone to be converted into.

In this case, the image processing apparatus 1 is not connected to a network and thus, though it takes longer, photo-to-painting conversion processing is performed inside the main body of the image processing apparatus 1. After conversion of the original image into bitmap data in step S222, photo-to-painting conversion processing is performed according to parameters of the tone selected in step S223. The original image has a large image size and after the image is converted into a size appropriate for the display on the liquid crystal display panel 3 in step S224, the processing proceeds to step S230 to display the painting tone image obtained by photo-to-painting conversion.

If proceeding from step S218, the thumbnail has a display size appropriate for the liquid crystal display panel 3 and display processing of the thumbnail is directly performed.

In step S232, data represented in bitmap format is compressed into JPEG format to store the photo-to-painting converted image in the internal memory 14 or the memory card 60 (step S234). If proceeding via step S218, the photo-to-painting converted image of the thumbnail is stored and if proceeding via step S223, the photo-to-painting converted image of the original image is stored.

In step S236, whether the image processing apparatus 1 is connected to a network is determined again. Even if the image processing apparatus 1 cannot be connected to a network in step S208 due to conditions of electric waves, conditions of circuits, or settings of the image processing apparatus 1, when the connection is confirmed, the original image is uploaded to the print site 550 and the original image whose tone is converted on the side of the site 550 is downloaded (step S238) and stored (step S240). If the photo-to-painting conversion is made inside the image processing apparatus 1 in step S223, this step may be skipped.

If the photo-to-painting conversion engine included in the photo-to-painting conversion server 525 at the print site 550 is more powerful than the photo-to-painting conversion engine 200 of the image processing apparatus 1, the converted original image may be downloaded from the print site 550 regardless of the result in step S223.

In step S236, looping up to confirmation of a network connection is shown, but the connection may be confirmed and downloading may be performed at another timing, such as when power is turned on again.

C. Print Site in the Present Embodiment

Next, processing on the side of the print site 550 will be described. The print site 550 is a site that basically provides a service of performing photo-to-painting conversion of an image uploaded from a user and to print the converted image.

The print site 550 is connected to the image processing apparatus 1, which is a terminal, via the Internet 500 and includes, as shown in FIG. 3, the storage server 551 that stores image data received from the image processing apparatus 1, the photo-to-painting conversion server 525 that converts the tone of image data stored in the storage server 551, an tone selector 554 that selects the tone for conversion by the photo-to-painting conversion engine of the photo-to-painting conversion server 525, a size selector 555 that selects the print size, a print medium selector 556 that selects the print medium, a printer 557 that prints a converted image converted by the photo-to-painting conversion engine in the tone selected by the tone selector 554 from the received image data in the size selected by the size selector 555 on the medium selected by the print medium selector 556, a transmitter 558 that transmits the converted image to the image processing apparatus 1, and a parameter memory 559 storing parameters for photo-to-painting conversion, similar to the parameter memory 410. The tone selected by the tone selector 554, the converted image converted by the photo-to-painting conversion server 525, the size selected by the size selector 555, and the medium selected by the print medium selector 556 are temporarily stored in the storage server 551 and can be changed under the control of the image display server 552.

The user is authenticated by the authentication server 521 by first registering a mail address or the like. An image uploaded by the user is stored in the storage server 551. However, in consideration of privacy, the image is automatically deleted when a predetermined period passes.

An uploaded image can be converted into various painting tone images by the photo-to-painting conversion server 525. As described above, selectable tones include oil painting, thick oil painting, gothic oil painting, fauvist oil painting, water color painting, gouache painting, pastel painting, color pencil sketch, pointillism, silkscreen, drawing, and air brush.

However, selectable tones are not limited to the above examples and conversion to which features of painters such as van Gogh, Monet, and Picasso are added may be made selectable. If painting conversion of the image uploaded with the selected tone is performed and an order is placed by selecting the print size and print medium, the medium on which the painting converted image is printed can, be purchased.

Basically, when the conversion tone is selected, the print medium (such as paper, a canvas, a T-shirt, and a mug cup) is selected, and an order of print is placed, a bill is charged. It is necessary for the user to try a variety of converted tones and try to convert plural uploaded images and thus, photo-to-painting converted images are also temporarily stored in the storage server 551. When the user logs in again a later date, the user can compare images converted in the past and newly converted images to be able to decide images to be printed.

As described above, when the user uploads an original image to the print site 505, selects the conversion tone, selects the size of a print, and selects a print medium, an image is displayed on the LCD panel 3 of the image processing apparatus 1 so that the user can confirm the image and perform selection. In general, the original image has 4000×3000 pixels or more and the LCD panel 3 has 800×600 pixels. The print site 550 reduces the original image and transmits the reduced image to the image processing apparatus 1 over a network to display the image on the LCD panel 3.

While photo-to-painting converted images that are not ordered to print are made downloadable, such photo-to-painting converted images are electrically watermarked or a logo is attached thereto to indicate that the images are not originals.

Thus, while the user can use the print site 550 alone, as shown in FIG. 17, the print site 550 can cooperate with the image processing apparatus 1 to convert a tone of image data transmitted from the image processing apparatus 1 according to the type of tone or predetermined parameters transmitted together and to return the conversion result to the image processing apparatus 1.

Accordingly, the user of the image processing apparatus 1 can efficiently obtain converted images by seamlessly using the main body and a network.

D. Effect of the Embodiments

According to the embodiments, as described above, a photo-to-painting converted image, particularly an image converted into a painting tone can efficiently be obtained by seamlessly using the main body and a network in accordance with the connected state of the network.

Also, an image can be prevented from being uploaded to a network by anyone other than the owner of the image processing apparatus by face recognition.

Also, an image set to be secret can be prevented from being uploaded inadvertently to a network.

Also, a system to obtain a photo-to-painting converted image, particularly an image converted into a painting tone can efficiently be obtained by seamlessly using the main body and a network in accordance with the connected state of the network can be provided.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image processing apparatus connectable to a server, the apparatus comprising:
a first storage configured to store an original image;
a second storage configured to store data indicating tones;
a selector configured to select a data item indicating a tone from the data stored in the second storage;
a processor configured to change a tone of a reduced image of the original image stored in the first storage based on the selected data item indicating the tone in order to output a tone-changed reduced image;
a display configured to display the tone-changed reduced image output from the processor;
a connection determination unit configured to determine whether the image processing apparatus is connected to the network;
a transmitter configured to transmit the original image stored in the first storage to the server via the network together with the selected data item indicating the tone when the connection determination unit determines that the image processing apparatus is connected to the network;

a conversion controller configured to cause the processor to change the tone of the original image based on the selected data item indicating the tone when the connection determination unit determines that the image processing apparatus is not connected to the network; and a receiver configured to receive the original image whose tone is changed by the server while the image processing apparatus is connected to the network.

2. The apparatus according to claim 1, wherein the processor changes values of pixels constituting the original image according to predetermined parameters associated with the selected data item indicating the tone.

3. The apparatus according to claim 2, wherein the data indicating tones comprises data indicating a painting tone and the processor changes the tone of the original image to a painting tone.

4. The apparatus according to claim 1, further comprising:

a secret setting unit configured to make a secret setting to the original image; and a second transmission controller configured to determine whether to transmit the original image to the server via the network in accordance with a setting result by the secret setting unit.

\* \* \* \* \*